(12) United States Patent
Kogusuri

(10) Patent No.: US 9,817,613 B2
(45) Date of Patent: Nov. 14, 2017

(54) GENERATING INTEGRATED SHEET INFORMATION FOR AN IMAGE FORMING SYSTEM

(71) Applicant: Yuji Kogusuri, Kanagawa (JP)

(72) Inventor: Yuji Kogusuri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/071,156

(22) Filed: Mar. 15, 2016

(65) Prior Publication Data
US 2016/0274827 A1 Sep. 22, 2016

(30) Foreign Application Priority Data

Mar. 20, 2015 (JP) .................................. 2015-058397
Mar. 3, 2016 (JP) .................................. 2016-041470

(51) Int. Cl.
*G06F 3/12* (2006.01)

(52) U.S. Cl.
CPC .......... *G06F 3/1205* (2013.01); *G06F 3/1217* (2013.01); *G06F 3/1236* (2013.01); *G06F 3/1258* (2013.01); *G06F 3/1279* (2013.01)

(58) Field of Classification Search
None
See application file for complete search history.

(56) References Cited

U.S. PATENT DOCUMENTS

| 2007/0086022 A1* | 4/2007 | Kumagai | ............ G06F 11/1451 358/1.1 |
| 2010/0214588 A1* | 8/2010 | Nakahara | ............ G06F 3/1204 358/1.13 |

FOREIGN PATENT DOCUMENTS

JP 2007-128493 5/2007

* cited by examiner

*Primary Examiner* — Andrew H Lam
(74) *Attorney, Agent, or Firm* — Duft Bornsen & Fettig LLP

(57) ABSTRACT

An image processing apparatus, communicable with an image forming apparatus useable for an image forming operation on a recording medium based on input image data, includes a processor to acquire output-side sheet information from the image forming apparatus, the output-side sheet information correlating attribution information related to the recording medium and engine adjustment information indicating image formation processing contents to be used for an image forming operation, to refer processing-side sheet information stored in the image processing apparatus, the processing-side sheet information correlating attribution information related to the recording medium and image processing setting information indicating image processing contents to be applied to the input image data, to generate integrated sheet information by correlating the attribution information, the image processing setting information, and the engine adjustment information, and to store the integrated sheet information in a memory.

10 Claims, 12 Drawing Sheets

FIG. 8A

| |
|---|
| SHEET IDENTIFICATION NUMBER: 1 |
| SHEET NAME: A3 BOOKBINDING PAPER |
| SHEET SIZE: A3 |
| SHEET TYPE: PLAIN PAPER |
| SHEET COLOR: WHITE |
| SHEET WEIGHT: 76g/m² |
| CONDENSED PAGE NUMBER: 2 |
| HALFTONE PATTERN DESIGNATION: TEXT MODE |
| WATERMARK DESIGNATION: LOGO |

Cd-1; Jk-1 (upper group), Jd-1 (lower group)

FIG. 8B

| |
|---|
| SHEET IDENTIFICATION NUMBER: 2 |
| SHEET NAME: A3 BOOKBINDING COVER SHEET |
| SHEET SIZE: A3 |
| SHEET TYPE: THICK PAPER |
| SHEET COLOR: BLUE |
| SHEET WEIGHT: 123g/m² |
| CONDENSED PAGE NUMBER: 2 |
| HALFTONE PATTERN DESIGNATION: GRAPHIC MODE |
| WATERMARK DESIGNATION: NONE |

Cd-2; Jk-2 (upper group), Jd-2 (lower group)

FIG. 9A

| |
|---|
| SHEET IDENTIFICATION NUMBER: 1 |
| SHEET NAME: A3 BOOKBINDING PAPER |
| SHEET SIZE: A3 |
| SHEET TYPE: PLAIN PAPER |
| SHEET COLOR: WHITE |
| SHEET WEIGHT: 76g/m² |
| FUSING TEMPERATURE: 200 CELSIUS DEGREES |
| PRINT POSITION CORRECTION: x = 0 dot, y = 0 dot |
| TONER ADHESION AMOUNT CORRECTION: STANDARD |

Cg-1; Jk-1 (upper group), Jg-1 (lower group)

FIG. 9B

| |
|---|
| SHEET IDENTIFICATION NUMBER: 2 |
| SHEET NAME: A3 BOOKBINDING COVER SHEET |
| SHEET SIZE: A3 |
| SHEET TYPE: THICK PAPER |
| SHEET COLOR: BLUE |
| SHEET WEIGHT: 123g/m² |
| FUSING TEMPERATURE: 220 CELSIUS DEGREES |
| PRINT POSITION CORRECTION: x = 0 dot, y = 0 dot |
| TONER ADHESION AMOUNT CORRECTION: STANDARD |

Cg-2; Jk-2 (upper group), Jg-2 (lower group)

FIG. 10A

| Ct-1 | |
|---|---|
| SHEET IDENTIFICATION NUMBER: 1 | ⎫ |
| SHEET NAME: A3 BOOKBINDING PAPER | ⎪ |
| SHEET SIZE: A3 | ⎬ Jk-1 |
| SHEET TYPE: PLAIN PAPER | ⎪ |
| SHEET COLOR: WHITE | ⎪ |
| SHEET WEIGHT: 76g/m² | ⎭ |
| CONDENSED PAGE NUMBER: 2 | ⎫ |
| HALFTONE PATTERN DESIGNATION: TEXT MODE | ⎬ Jd-1 |
| WATERMARK DESIGNATION: LOGO | ⎭ |
| ENGINE ADJUSTMENT VALUE: 200, 0, 0, STANDARD, ... | } Jgs-1 |

FIG. 10B

| Ct-2 | |
|---|---|
| SHEET IDENTIFICATION NUMBER: 2 | ⎫ |
| SHEET NAME: A3 BOOKBINDING COVER SHEET | ⎪ |
| SHEET SIZE: A3 | ⎬ Jk-2 |
| SHEET TYPE: THICK PAPER | ⎪ |
| SHEET COLOR: BLUE | ⎪ |
| SHEET WEIGHT: 123g/m² | ⎭ |
| CONDENSED PAGE NUMBER: 2 | ⎫ |
| HALFTONE PATTERN DESIGNATION: GRAPHIC MODE | ⎬ Jd-2 |
| WATERMARK DESIGNATION: NONE | ⎭ |
| ENGINE ADJUSTMENT VALUE: 220, 0, 0, STANDARD, ... | } Jgs-2 |

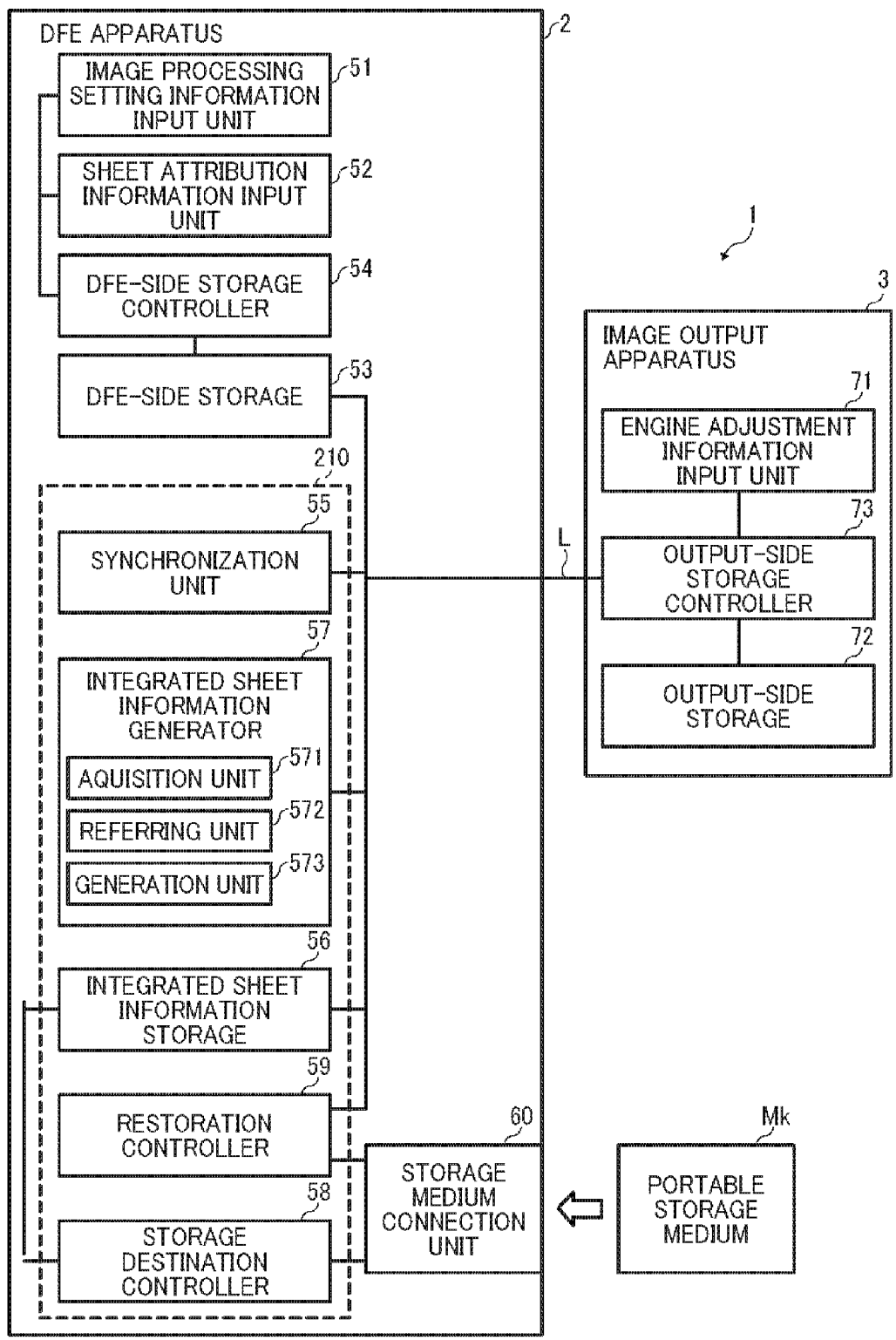

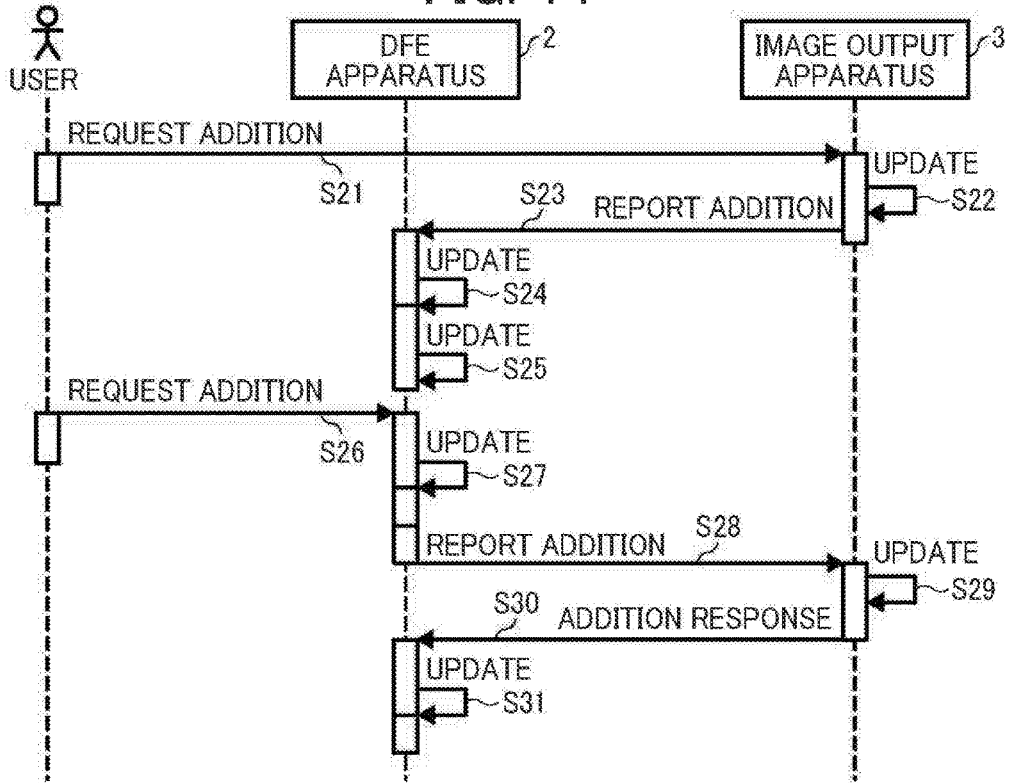
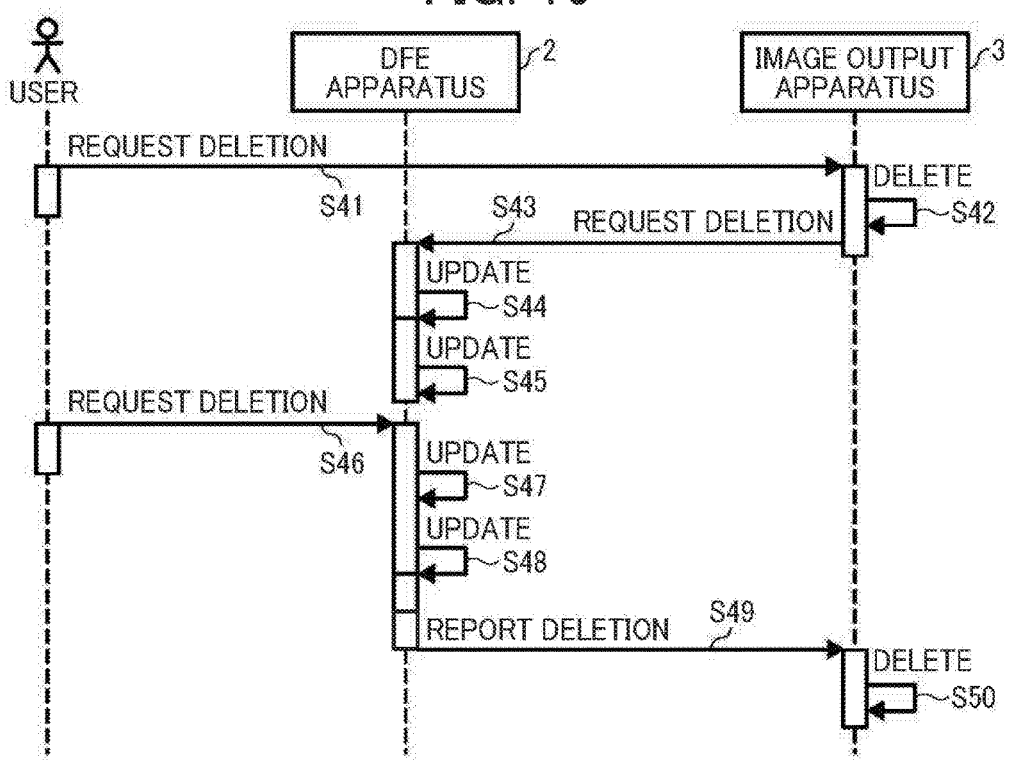

GENERATING INTEGRATED SHEET INFORMATION FOR AN IMAGE FORMING SYSTEM

CROSS-REFERENCE TO RELATED APPLICATION

This application claims priority pursuant to 35 U.S.C. §119(a) to Japanese Patent Application Nos. 2015-058397, filed on Mar. 20, 2015 and 2016-041470, filed on Mar. 3, 2016 in the Japan Patent Office, the disclosure of which is incorporated by reference herein in its entirety.

BACKGROUND

Technical Field

The present invention relates to an image forming system, an image processing apparatus, a method of managing sheet information, and a storage medium of a program.

Background Art

Conventionally, image forming apparatuses such as printers, copiers, and multi-functional machines can be set with print setting information such as sheet size, sheet type, and image density by users, and the set print setting information is stored in non-volatile memories disposed in the image forming apparatuses. Further, the image forming apparatuses include an interface (I/F) of a portable storage medium such as universal serial bus (USB) memory and secure digital (SD) card, and the print setting information is stored in the portable storage medium attached to the I/F as backup information. With this configuration, when troubles occur to the image forming apparatuses, the print setting information can be restored on the non-volatile memory by using the print setting information stored in the portable storage medium.

Recently, image forming systems configured with a digital front end (DFE) apparatus, and one or more image forming apparatuses connected or coupled to the DFE apparatus are devised. In this image forming system, the DFE apparatus receives print data and print information from a host apparatus, performs raster image processor (RIP) processing to the print data, transfers the processed image data such as image drawing data to the image forming apparatus via a memory, and instructs the image forming apparatus to perform a printing operation.

Further, an image forming system configured with a DFE apparatus and an image forming apparatus, or an image forming apparatus configured with an image processing unit and an image forming unit can be devised, in which the DFE apparatus and the image forming apparatus can be operated independently with each other, or the image processing unit and the image forming unit in the image forming apparatus can be operated independently with each other. In these configurations, setting information (hereinafter, image processing setting information) at the DFE apparatus and the image processing unit (hereinafter, DFE apparatus, image processing apparatus), and setting information (hereinafter, engine adjustment information) at the image forming apparatus and the image forming unit (hereinafter, image forming apparatus) can be set independently with each other, and the image processing setting information can be stored in a non-volatile memory disposed for the DFE apparatus, and engine adjustment information can be stored in a non-volatile memory disposed for the image forming apparatus independently.

Further, the setting information includes attribution information of sheet to be used at both of the DFE apparatus and the image forming apparatus as the same sheet information. Therefore, the DFE apparatus stores the image processing setting information and the sheet attribution information, and the image forming apparatus stores the engine adjustment information and the sheet attribution information.

In this configuration, the DFE apparatus includes an interface (I/F) of a portable storage medium, and the image forming apparatus also includes an interface (I/F) of a portable storage medium, in which the DFE apparatus can store the image processing setting information and the sheet attribution information to the portable storage medium attached to the I/F of the DFE apparatus, and the image forming apparatus can store the engine adjustment information and the sheet attribution information to the portable storage medium attached to the I/F of the image forming apparatus. Therefore, the DFE apparatus can store the image processing setting information and the sheet attribution information to the portable storage medium as the print setting information, and the image forming apparatus can store the engine adjustment information and the sheet attribution information to the portable storage medium as the print setting information, which can be performed separately or independently.

With this configuration, when troubles occur to the DFE apparatus or image forming apparatus in the image forming system, the image processing setting information and the sheet attribution information can be restored to the non-volatile memory in the DFE apparatus by using the print setting information stored in the portable storage medium, and further, the engine adjustment information and the sheet attribution information can be restored the non-volatile memory at the image forming apparatus by using the print setting information stored in the portable storage medium.

However, in this conventional configuration, the image processing setting information and the sheet attribution information of the DFE apparatus is stored in one portable storage medium attachable to the interface (I/F) of the DFE apparatus while the engine adjustment information and the sheet attribution information of the image forming apparatus is stored in another portable storage medium attachable to the interface (I/F) of the image forming apparatus. Therefore, the image processing setting information and the sheet attribution information of the DFE apparatus, and the engine adjustment information and the sheet attribution information of the image forming apparatus are required to be to synchronized, in which integrity of setting information between different storage media may become difficult to attain, and handling of the setting information may become complex works for users.

For example, when the storing timing such as backup timing of the setting information to the portable storage media are different between the DFE apparatus and the image forming apparatus, discrepancies may occur between the image processing setting information and the sheet attribution information set for the DFE apparatus, and the engine adjustment information and the sheet attribution information set for the image forming apparatus. In this case, the discrepancies are required to be solved by manual operations of users by synchronizing the image processing setting information and the sheet attribution information set for the DFE apparatus, and the engine adjustment information and the sheet attribution information set for the image forming apparatus, which are complex works for users.

SUMMARY

As one aspect of the present invention, an image processing apparatus is devised. The image processing apparatus is communicable with an image forming apparatus useable for an image forming operation on a recording medium based on input image data. The image processing apparatus includes a processor to acquire output-side sheet information from the image forming apparatus, the output-side sheet information correlating attribution information related to the recording medium and engine adjustment information indicating image formation processing contents to be used for an image forming operation, to refer processing-side sheet information stored in the image processing apparatus, the processing-side sheet information correlating attribution information related to the recording medium and image processing setting information indicating image processing contents to be applied to the input image data, to generate integrated sheet information by correlating the attribution information, the image processing setting information, and the engine adjustment information, and to store the integrated sheet information in a memory.

As another aspect of the present invention, an image forming system is devised. The image forming system includes an image processing apparatus to perform image processing to image data, the image processing apparatus including a first processor to store processing-side sheet information correlating attribution information related to a recording medium and image processing setting information indicating image processing contents to be applied to the image data, and an image forming apparatus, communicable with the image processing apparatus, to form an image on the recording medium based on the image data processed by the image processing apparatus, the image forming apparatus including a second processor to store output-side sheet information correlating attribution information related to the recording medium and engine adjustment information indicating image formation processing contents to be used for an image forming operation. At least one of the first processor and the second processor acquires the output-side sheet information from the image forming apparatus, refers to the processing-side sheet information stored in the image processing apparatus, generates integrated sheet information by correlating the attribution information, the image processing setting information, and the engine adjustment information, and stores the integrated sheet information in a memory.

As another aspect of the present invention, a method of managing sheet information for an image forming system is devised. The image forming system includes an image processing apparatus for performing an image processing to image data, and an image forming apparatus communicable with the image processing apparatus for an image forming operation on a recording medium based on the image data processed by the image processing apparatus. The method includes acquiring, at the image processing apparatus, output-side sheet information stored in the image forming apparatus, the output-side sheet information correlating attribution information related to the recording medium and engine adjustment information indicating image formation processing contents to be used for an image forming operation, referring to processing-side sheet information stored in the image processing apparatus, the processing-side sheet information correlating attribution information related to the recording medium and image processing setting information indicating image processing contents to be applied to the image data, generating integrated sheet information by correlating the attribution information, the image processing setting information, and the engine adjustment information, and storing the integrated sheet information in a memory.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 8A and 8B are examples of sheet information databases storable in the DFE apparatus;

FIGS. 9A and 9B are examples of sheet information databases storable in the image output apparatus;

FIGS. 10A and 10B are examples of integrated sheet information database;

FIG. 11 is a functional configuration of the DFE apparatus and the image output apparatus:

FIG. 14 is a second sequential chart of updating databases in the image forming system;

FIG. 15 is a third sequential chart of updating databases in the image forming system;

Figure 1:
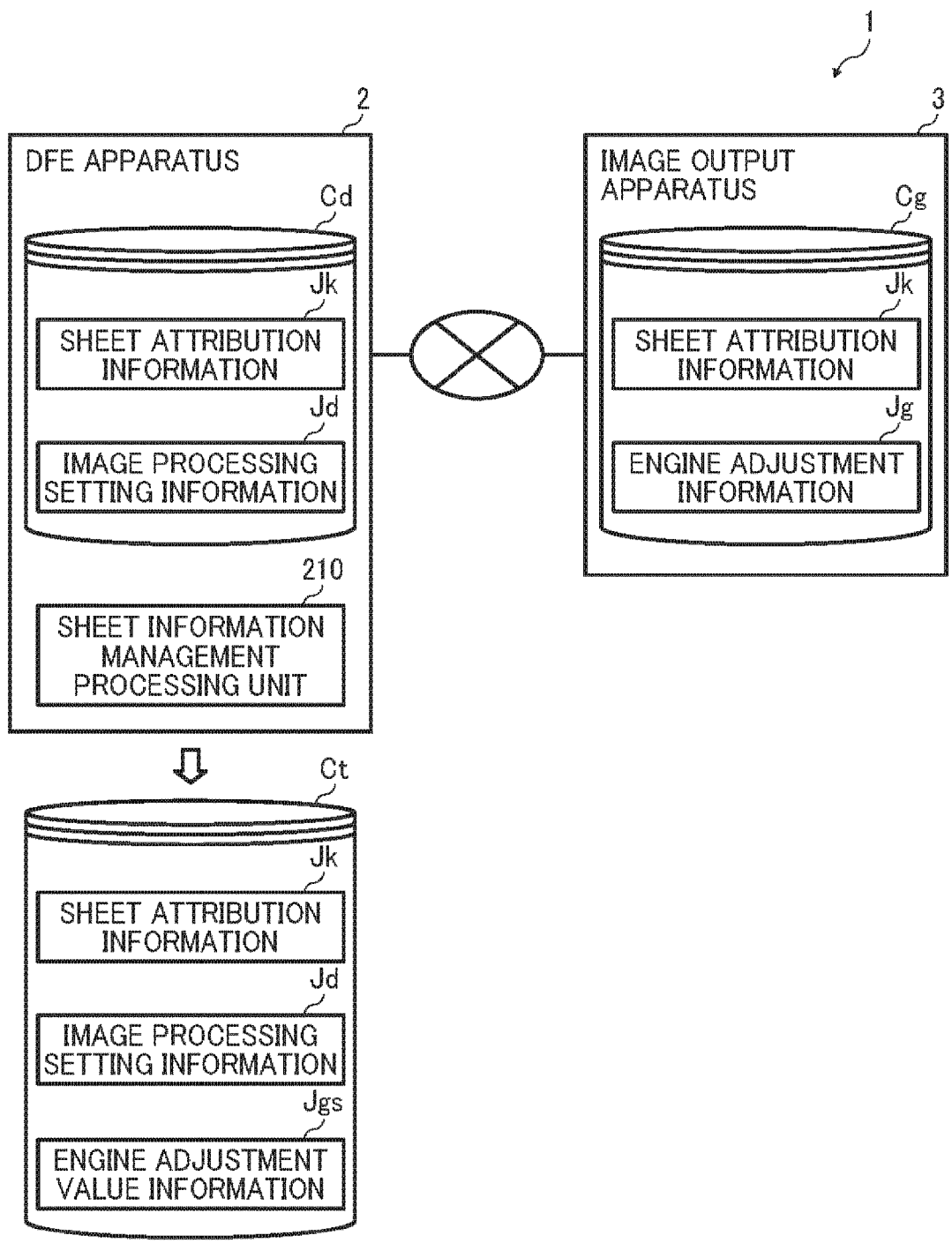
FIG. 1 is a schematic overview of an image forming system of one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

FIG. 1 is a schematic overview of an image forming system 1 or image generation system 1 of one or more example embodiments of the present invention. The image forming system 1 includes, for example, a digital front end (DFE) apparatus 2 used as an image processing apparatus, and an image output apparatus 3 used as image outputting or forming apparatus, in which the DFE apparatus 2 and the image output apparatus 3 can be connected or coupled with each other via a wired network and/or wireless network, with which the DFE apparatus 2 and the image output apparatus 3 can communicate data, information, signals with each other. In the image forming system 1, the DFE apparatus 2 receives image data input from an external apparatus, performs image processing to the image data in line with properties of recording media such as sheet to be formed with an image, and transfers the processed image data to the image output apparatus 3. After receiving the image data, the image output apparatus 3 performs an image forming operation on the sheet based on the settings in line with properties of sheet, and outputs the sheet formed with an image.

As to one or more example embodiments of the present invention, as illustrated in FIG. 1, the DFE apparatus 2 includes, for example, a first sheet information database "Cd" and a sheet information management processing unit 210, and the image output apparatus 3 includes, for example, a second sheet information database "Cg." The first sheet information database "Cd" of the DFE apparatus 2 stores a sheet attribution information "Jk" and image processing setting information "Jd" by correlating with each other. The second sheet information database "Cg" of the image output apparatus 3 stores the sheet attribution information "Jk" and engine adjustment information "Jg" by correlating with each other.

The sheet attribution information "Jk" is information that is shared by both of the first sheet information database "Cd" and the second sheet information database "Cg," and the sheet attribution information "Jk" indicates attribution or property information of sheets useable at the image output apparatus 3. In other words, the sheet attribution information "Jk" indicates attribution or property information of recording media such as sheets (e.g., paper) used for an image forming images at the image output apparatus 3.

The image processing setting information "Jd" indicates image processing contents to be applied to the image data, which can be referred to "information related to image processing." In other words, the image processing setting information "Jd" indicates various settings related to the image processing to the image data.

The engine adjustment information "Jg" indicates image formation contents used at the image output apparatus 3 for an image forming operation, which can be referred to "information related to the image forming operation." In other words, the engine adjustment information "Jg" indicates various settings to be applied to an engine unit in the image output apparatus 3. The engine adjustment information "Jg" is composed of a plurality of image formation contents to be used for an image forming operation of the image data processed by the DFE apparatus 2. The sheet information databases "Cd" and "Cg," and the integrated sheet information database "Ct" will be described in detail later.

As to one or more example embodiments of the present invention, when the DFE apparatus 2 is activated, the sheet information management processing unit 210 of the DFE apparatus 2 reads out the sheet attribution information "Jk" and the image processing setting information "Jd" from the first sheet information database "Cd." Further, when the DFE apparatus 2 is communicably connected or coupled to the image output apparatus 3, the sheet information management processing unit 210 can acquire engine adjustment value information "Jgs" generated from the engine adjustment information "Jg" correlated with the sheet attribution information "Jk" from the image output apparatus 3. Then, the sheet information management processing unit 210 generates the integrated sheet information database "Ct" by correlating the sheet attribution information "Jk," the image processing setting information "Jd," and the engine adjustment value information "Jgs." Further, when the sheet information management processing unit 210 receives a backup instruction or storing instruction of the integrated sheet information database "Ct," the sheet information management processing unit 210 stores the integrated sheet information database "Ct" to a portable storage medium attached to an external interface (I/F) of the DFE apparatus 2. Further, when at least one of the first sheet information database "Cd" and the second sheet information database "Cg" is changed, the sheet information management processing unit 210 updates the integrated sheet information database "Ct" based on the changed information to synchronize the two first sheet information databases "Cd" and "Cg," and the integrated sheet information database "Ct" one another.

As to the one or more example embodiments of the present invention, by performing the above described processing, the two sheet information databases "Cd" and "Cg," and the integrated sheet information database "Ct" can be synchronized consistently Therefore, even if the backup process is performed at different timing for each of the two sheet information databases "Cd" and "Cg," the two sheet information databases "Cd" and "Cg," and the integrated sheet information database "Ct" can be synchronized one another without a manual operation of users, and thereby the information related to image processing, the information related to image forming, and the attribution information of recording media can be easily managed.

In an example configuration of FIG. 1, the sheet information management processing unit 210 is disposed in the DFE apparatus 2, but not limited hereto. For example, the sheet information management processing unit 210 can be disposed in the image output apparatus 3 to implement the capabilities of the sheet information management processing unit 210 at the image output apparatus 3, in which the sheet information management processing unit 210 can store the integrated sheet information database "Ct", for example, to a portable storage medium connected to the image output apparatus 3.

Figure 2:
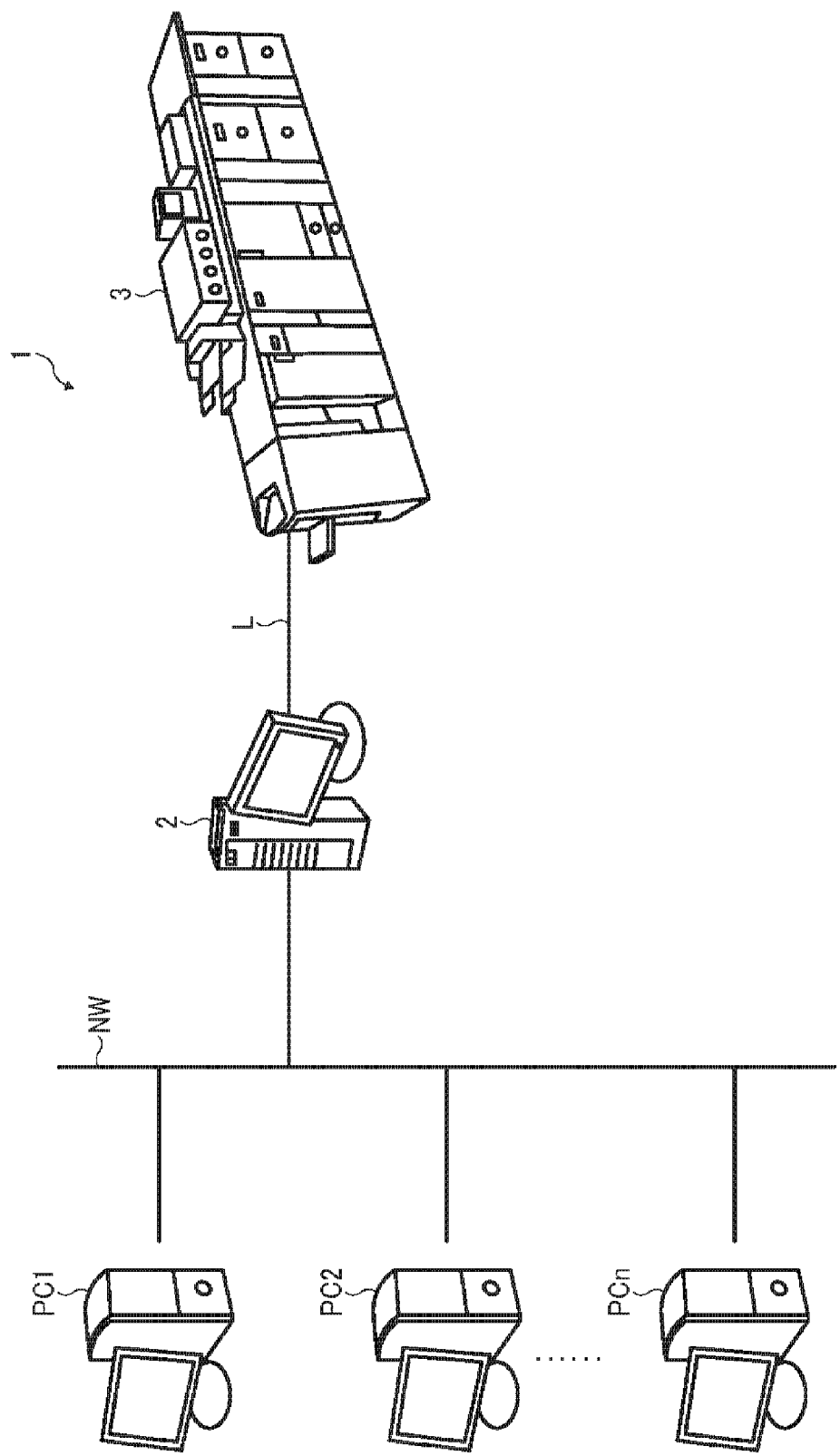
FIG. 2 illustrates an example of a schematic overall configuration of the image forming system of FIG. 1.

FIG. 2 illustrates an example of a schematic overall configuration of the image forming system 1.

As illustrated in FIG. 2, the image forming system 1 includes, for example, the DFE apparatus 2 used as an image processing apparatus, and the image output apparatus 3 used as an image forming apparatus, in which the DFE apparatus 2 is communicably connected or coupled to the image output apparatus 3. For example, the DFE apparatus 2 can be communicably connected or coupled to the image output apparatus 3 by a communication line L such as a wired line or wirelessly. In an example configuration illustrated in FIG. 2, the DFE apparatus 2 is communicably connected or coupled to one image output apparatus 3, but the DFE apparatus 2 can be communicably connected or coupled to a plurality of image output apparatuses 3 as required.

Further, the DFE apparatus 2 can be communicably connected or coupled to a plurality of computers "PC1" to "PCn" via a network such as local area network (LAN) such as wired network and wireless network.

Further, in an example configuration illustrated in FIG. 2, the image forming system 1 is configured with the DFE apparatus 2 and the image output apparatus 3, which are disposed as separate or independent apparatuses by encasing the DFE apparatus 2 and the image output apparatus 3 in different housing, but not limited hereto. For example, the DFE apparatus 2 can be disposed in a housing of the image output apparatus 3, in which the image output apparatus 3 used as an image forming apparatus includes an image processing unit that can perform the image processing in the housing of the image output apparatus 3.

Each of the computers PC1 to PCn can generate a print request including print data using any page description language (PDL) from data generated by using the installed applications and print settings. Each of the computers PC1 to PCn can add a sheet identification number or sheet name to the generated print request, and transmits the generated print request added with the sheet identification number or sheet name to the DFE apparatus 2. After receiving the print request, the DFE apparatus 2 designates sheet information, to be described later, based on the sheet identification number or sheet name added to the print request.

The image output apparatus 3 can employ a printer using a printing method such as electrophotography and inkjet method, in which the image output apparatus 3 prints an image on a recording medium such as paper and film (hereinafter, simply referred to "sheet") based on a print job received from the DFE apparatus 2.

Figure 3:
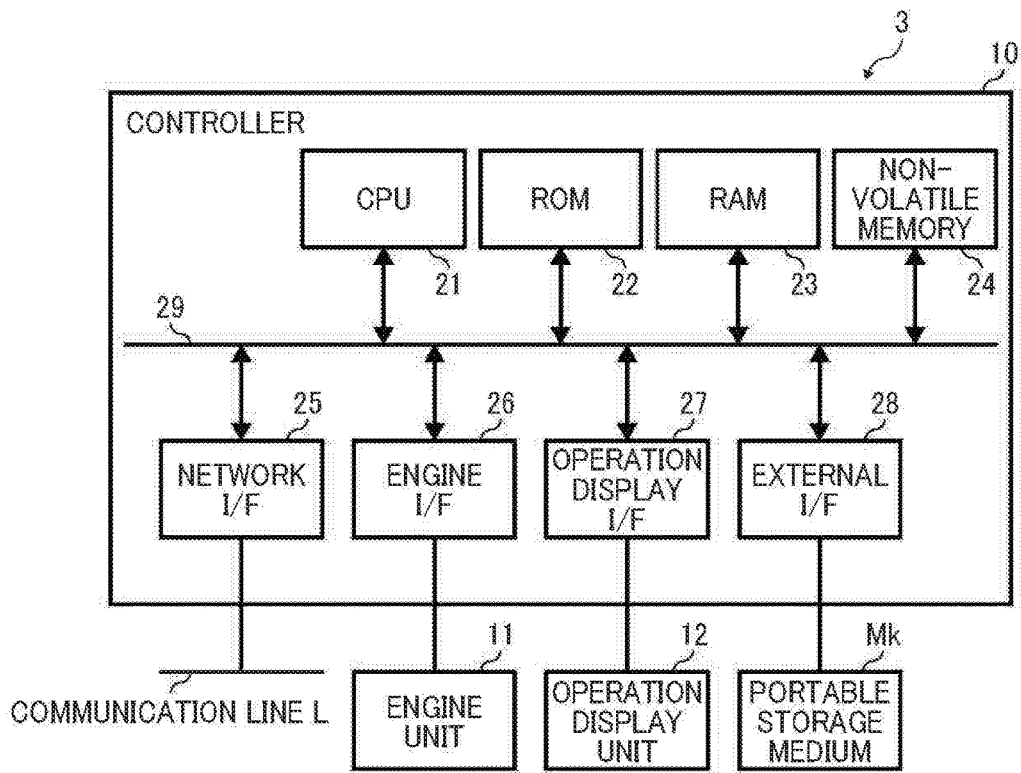
FIG. 3 is a hardware configuration of an image output apparatus employable for the image forming system of FIG. 1.

A description is given of a hardware configuration of the image output apparatus 3 with reference to FIG. 3. FIG. 3 is a hardware configuration of the image output apparatus 3. As illustrated in FIG. 3 the image output apparatus 3 includes, for example, a controller 10, an engine unit 11, and an operation display unit 12. The controller 10 includes, for example, a central processing unit (CPU) 21, a read only memory (ROM) 22, a random access memory (RAM) 23, a non-volatile memory 24, a network interface (I/F) 25, an engine interface (I/F) 26, an operation display interface (I/F) 27, and an external interface (I/F) 28, in which each of the units are connected one another by a bus 29.

The engine unit 11 employs, for example, a tandem electrophotography, in which image forming units of special color, black (K), magenta (M), cyan (C), and yellow (Y) are disposed along a transport belt. Each of the image forming units includes, for example, a photoconductor, an optical writing unit, a development unit, a charger, and a cleaning unit around the photoconductor. The engine unit 11 activates the optical writing unit of each of the image forming units based on image drawing data of each of colors received from the DFE apparatus 2 to form a latent image on each of the photoconductors. At each of the image forming units of each of colors the engine unit 11 activates the development unit to supply toner onto the photoconductor to develop the latent image as a toner image of each of colors, and activates a sheet feeder to feed a sheet (i.e., recording medium) between the photoconductor and a transfer unit, and transfers the toner images of each of colors from the photoconductor on the sheet by sequentially overlaying the toner images of each of colors. The engine unit 11 transports the sheet transferred with the toner images to a fusing unit, and fuses the toner images on the sheet by applying heat and pressure at the fusing unit, with which color image can be formed and output as print product. Further, instead of disposing the image forming units disposed along the transport belt, the image forming units can be disposed along an intermediate transfer belt in the engine unit 11.

The operation display unit 12 includes, various operation keys such as ten keys, a clear/stop key, a start key, a reset key, a program key, and a display. For example, instructions for performing various operations can be input to the image output apparatus 3 by operating the operation keys of the operation display unit 12. For example, the operation display unit 12 can be used to input the engine adjustment information "Jg" and the sheet attribution information "Jk" (see FIG. 5) when a method of managing sheet information is performed.

The display of the operation display unit 12 employs, for example, a liquid crystal display (LCD) having a touch panel, with which a touch operation on the LCD can be detected. The display can display various information such as information to be reported to a user from the image output apparatus 3 and operation information of the operation keys. For example, the display can display various information related to the method of managing sheet information.

The controller 10 stores various programs and data to the ROM 22. For example, the ROM 22 stores programs for data processing and managing by the controller 10, programs for controlling peripheral module, programs and data required to be executed at the image output apparatus 3 when a given method is performed. Specifically, the ROM 22 stores various programs such as a basic processing program of the image output apparatus 3, firmware, and programs required to be executed at the image output apparatus 3 when the method of managing sheet information is performed, and various data used for executing the programs.

The CPU 21 controls each unit in the image output apparatus 3 based on programs stored in the ROM 22 and using the RAM 23 as a working memory to perform various image processing, and performs one or more processes required to be executed at the image output apparatus 3 when the method of managing sheet information is performed.

The RAM 23 can be used as a working memory of the CPU 21. Further, the RAM 23 can be used as a buffer memory to temporally store print data received from the DFE apparatus 2 such as a computer, and also a bitmap memory to store image drawing data that can be used for actual printing, in which the image drawing data can be generated by converting the received print data.

The non-volatile memory 24 employs, for example, a nonvolatile random access memory (NVRAM), solid state drive (SSD), and hard disk drive (HDD). The non-volatile memory 24 can retain or store data and information even when the power supply to the image output apparatus 3 is OFF. The non-volatile memory 24 can store data that is required to be retained even when the power supply of the image output apparatus 3 is OFF. For example, the non-volatile memory 24 can store system settings and various data used for the method of managing sheet information under the control of the CPU 21. Specifically, the non-volatile memory 24 stores the second sheet information database "Cg."

The network I/F 25 is connected or coupled to the communication line L to communicate with the DFE apparatus 2 via the communication line L.

The engine I/F 26 is connected or coupled to the engine unit 11 to communicate signals and data between the controller 10 and the engine unit 11. For example, the controller 10 outputs control signals and data such as image drawing data to the engine unit 11, and the engine unit 11 outputs various signals such as status signals to the controller 10.

The operation display I/F 27 is connected or coupled to the operation display unit 12 to communicate signals between the CPU 21 and the operation display unit 12.

Further, a portable storage medium Mk can be detachably connected or attached to the external I/F 28 of the image output apparatus 3. The portable storage medium Mk employs, for example, an integrated circuit (IC), secure digital (SD) card, flash memory card or the like. Various data can be written to the portable storage medium Mk and read out from the portable storage medium Mk under the control of the CPU 21.

Figure 4:
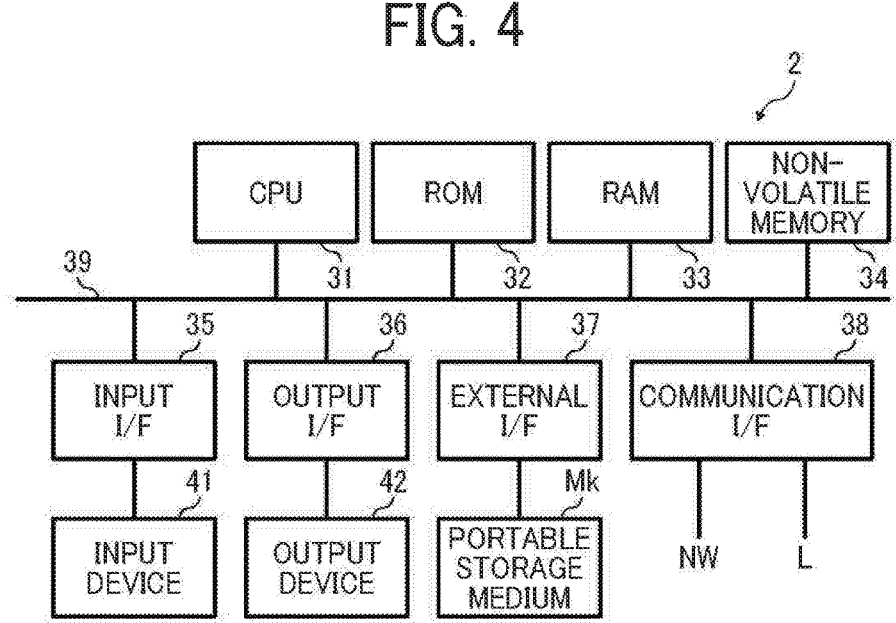
FIG. 4 is a hardware configuration of a DFE apparatus employable for the image forming system of FIG. 1.

A description is given of a hardware configuration of the DFE apparatus 2 with reference to FIG. 4. FIG. 4 is a hardware configuration of the DFE apparatus 2. As illustrated in FIG. 4, the DFE apparatus 2 includes, for example, a CPU 31, a ROM 32, a RAM 33, a non-volatile memory 34, an input I/F 35, an output I/F 36, an external I/F 37, and a communication I/F 38, and each of the units are connected by a bus 39.

The ROM 32 stores a basic program of the DFE apparatus 2, various programs required to be executed by the DFE apparatus 2 when the method of managing sheet information is performed, and system data.

The RAM 33 can be used as a working memory of the CPU 31, and can store the image data and other data. Further, the RAM 33 can store the integrated sheet information database "Ct" that integrates the sheet attribution information "Jk," the image processing setting information "Jd," and the engine adjustment value information "Jgs," in which the engine adjustment value information "Jgs" is a list of parameters of the engine adjustment information "Jg" obtained by the CPU 31 from the image output apparatus 3. The RAM 32 is a volatile memory that stored data is lost when the power supply of the DFE apparatus 2 is OFF.

The CPU 31 controls each unit in the DFE apparatus 2 based on programs stored in the ROM 32 and using the RAM 33 as the working memory to perform a basic processing of the DFE apparatus 2. Further, the CPU 31 performs one or more processes required to be executed at the DFE apparatus 2 when the method of managing sheet information is performed by executing programs of managing sheet information stored in the ROM 32.

The non-volatile memory 34 employs, for example, a nonvolatile random access memory (NVRAM), solid state drive (SSD), and hard disk drive (HDD). The non-volatile memory 24 can retain or store data and information even when the power supply to the DFE apparatus 2 is OFF. The non-volatile memory 34 can store data that is required to be retained even when the power supply of the DFE apparatus 2 is OFF. For example, the non-volatile memory 34 can store system settings and various data used for the method of managing sheet information under the control of the CPU 31. Specifically, the non-volatile memory 24 stores the first sheet information database "Cd."

The input I/F 35 can be connected or coupled to an input device 41 such as a key board, a mouse, a stylus pen, and a touch panel. The input I/F 35 is used to receive various instructions input from the input device 41, and to output the various instructions to the CPU 31.

The output I/F 36 can be connected or coupled to an output device 42 including a display, a light unit, and a speaker or the like. The output I/F 36 is used to output various data such as display data, flashing data, and audio data to the output device 42 under the control of the CPU 31

A portable storage medium Mk can be detachably connected to the external I/F 37 of the DFE apparatus 2. The portable storage medium Mk employs, for example, an integrated circuit (IC), secure digital (SD) card, flash memory card or the like. Various data can be written to the portable storage medium Mk and read out from the portable storage medium Mk under the control of the CPU 31. For example, under the control of the CPU 31, the external I/F 37 can write and store the integrated sheet information database "Ct" to the portable storage medium Mk, and further, can read out the integrated sheet information database "Ct" stored in the portable storage medium Mk.

The communication I/F 38 can be connected or coupled to the communication line L and a network NW. The communication I/F 38 is used to communicate with the image output apparatus 3 via the communication line L, and is used to communicate with the computers PC1 to PCn via the network NW.

The sheet information management program can be provided to the programmable device using any carrier medium or storage medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), secure digital (SD) card, a solid state memory device or the like, but not limited these. The sheet information management program can be read from the programmable device and loaded to the ROM 32 of the DFE apparatus 2 and the ROM 22 of the image output apparatus 3, with which the image forming system 1 can be configured to easily manage the image processing setting information "Jd," the engine adjustment information "Jg," and the sheet attribution information "Jk" having set with the synchronized status to be described later in detail. The sheet information management program can be a computer-readable program, described by object-oriented programming languages such as C, C++, C#, Java (registered trademark), JavaScript (registered trademark), Perl, Ruby, or legacy programming languages such as machine language, assembler language to control functional units used for the apparatus or system.

A description is given of the first sheet information database "Cd," the second sheet information database "Cg,"

and the integrated sheet information database "Ct" of one or more example embodiments of the present invention with reference to FIGS. 5 to 10.

Figure 5:
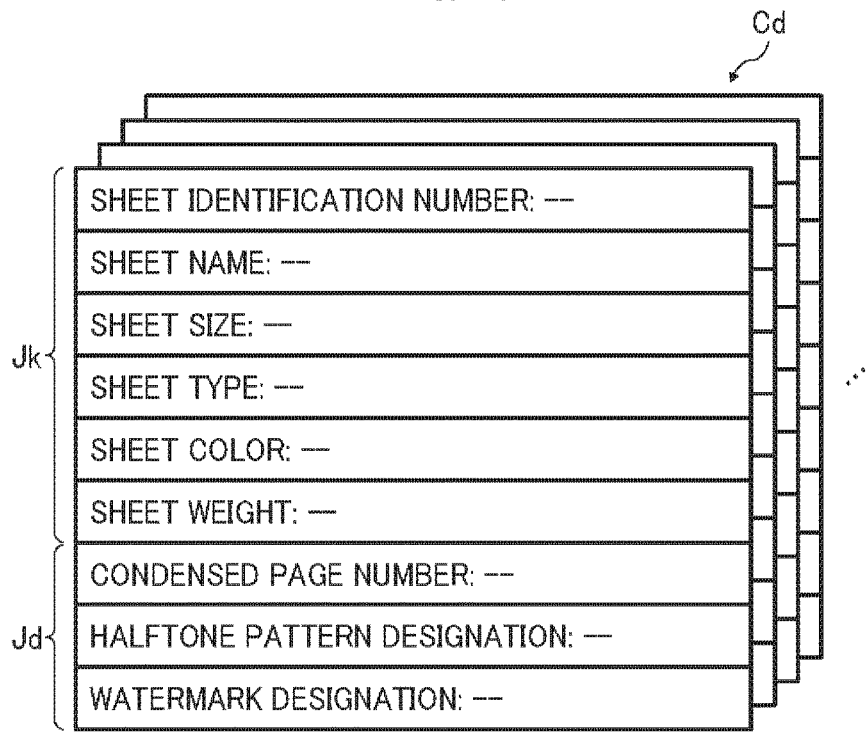
FIG. 5 is an example of a sheet information database storable in the DFE apparatus.

FIG. 5 is an example of a sheet information database storable in the DFE apparatus 2 of the one or more example embodiments of the present invention. As illustrated in FIG. 5, the first sheet information database "Cd" storable in the DFE apparatus 2 includes, for example, the sheet attribution information "Jk" and the image processing setting information "Jd."

The sheet attribution information "Jk" can be configured by parameters such as "sheet identification number, which can be used as identification information," "sheet name," "sheet size," "sheet type," "sheet color," and "sheet weight." The parameters of the sheet attribution information "Jk" relate to properties of sheet. The "sheet identification number" includes one or more values indicating the identification information to identify a target sheet from a plurality of sheets, and the "sheet identification number" can be used as correlating information or linking information to correlate or link the first sheet information database "Cd" and the second sheet information database "Cg." The "sheet name" includes one or more values indicating sheet names assigned to sheets. For example, the DFE apparatus 2 can designate a sheet when the assigned sheet name is transmitted with a print job. The "sheet size" includes one or more values indicating the sheet size such as A3 and A4 used for printing a target image. The "sheet type" includes one or more values indicating the sheet type such as plain paper, thick paper, coated paper, and over-head projection (OHP) sheet. The "sheet color" includes one or more values indicating the color of sheet such as white and blue. The "sheet weight" includes one or more values indicating the weight of sheet used for printing a target image.

The image processing setting information "Jd" can be configured by parameters such as "condensed page number," "halftone pattern designation," and "watermark designation." The "condensed page number" includes one or more values indicating the number of pages to be printed on one face such as 1, 2, 4, 9, 16 selectable and designatable by a user. The "halftone pattern designation" includes one or more values indicating the halftone patterns selectable by a user from the halftone patterns registered in the DFE apparatus 2 in advance. The "watermark designation" includes one or more values indicating the embossed texts and images selectable by a user from the watermarks registered in the DFE apparatus 2 in advance.

In an example case of FIG. 5, the image processing setting information "Jd" includes the above described three parameters, but the image processing setting information "Jd" can include other parameters as long as the parameters are related to the image processing. Further, since the image processing setting information "Jd" is correlated with the sheet attribution information "Jk," the image processing setting information "Jd" preferably includes the "sheet identification number." Hereinafter, information including the sheet attribution information "Jk" and the image processing setting information "Jd" is collectively referred to "DEF-side sheet information (or processing-side sheet information)," and it is assumed that the first sheet information database "Cd" stores the DEF-side sheet information for each of the sheet identification numbers.

Figure 6:
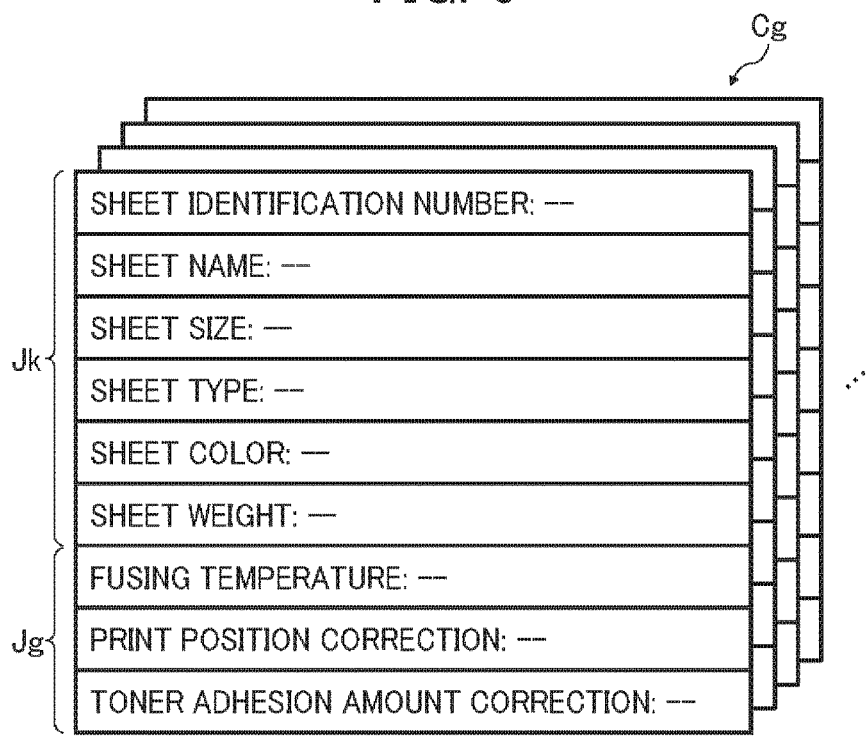
FIG. 6 is an example of a sheet information database storable in the image output apparatus.

FIG. 6 is an example of a sheet information database storable in the image output apparatus 3 of one or more example embodiments of the present invention, in which the second sheet information database "Cg" storable in the image output apparatus 3 includes, for example, the sheet attribution information "Jk," and the engine adjustment information "Jg." Since the sheet attribution information "Jk" is described above with reference to FIG. 5, the description of the sheet attribution information "Jk" is omitted. The engine adjustment information "Jg" can be configured by parameters such as "fusing temperature," "print position correction," and "toner adhesion amount correction." The "fusing temperature" includes one or more values indicating the fusing temperature set for the fusing unit. The "print position correction" includes one or more values indicating the correction values of print position of image to be printed on a sheet. The "toner adhesion amount correction" includes one or more values indicating the correction amount of toner adhesion amount. In an example case of FIG. 6, the engine adjustment information "Jg" includes the above described three parameters, but the engine adjustment information "Jg" can include other parameters as long as the parameters are related to the engine unit 11. Further, since the engine adjustment information "Jg" is correlated with the sheet attribution information "Jk," the engine adjustment information "Jg" preferably includes the "sheet identification number." Hereinafter, information including the sheet attribution information "Jk," and the engine adjustment information "Jg" is collectively referred to "output-side sheet information," and it is assumed that the second sheet information database "Cg" stores the output-side sheet information for each of the sheet identification numbers.

Figure 7:
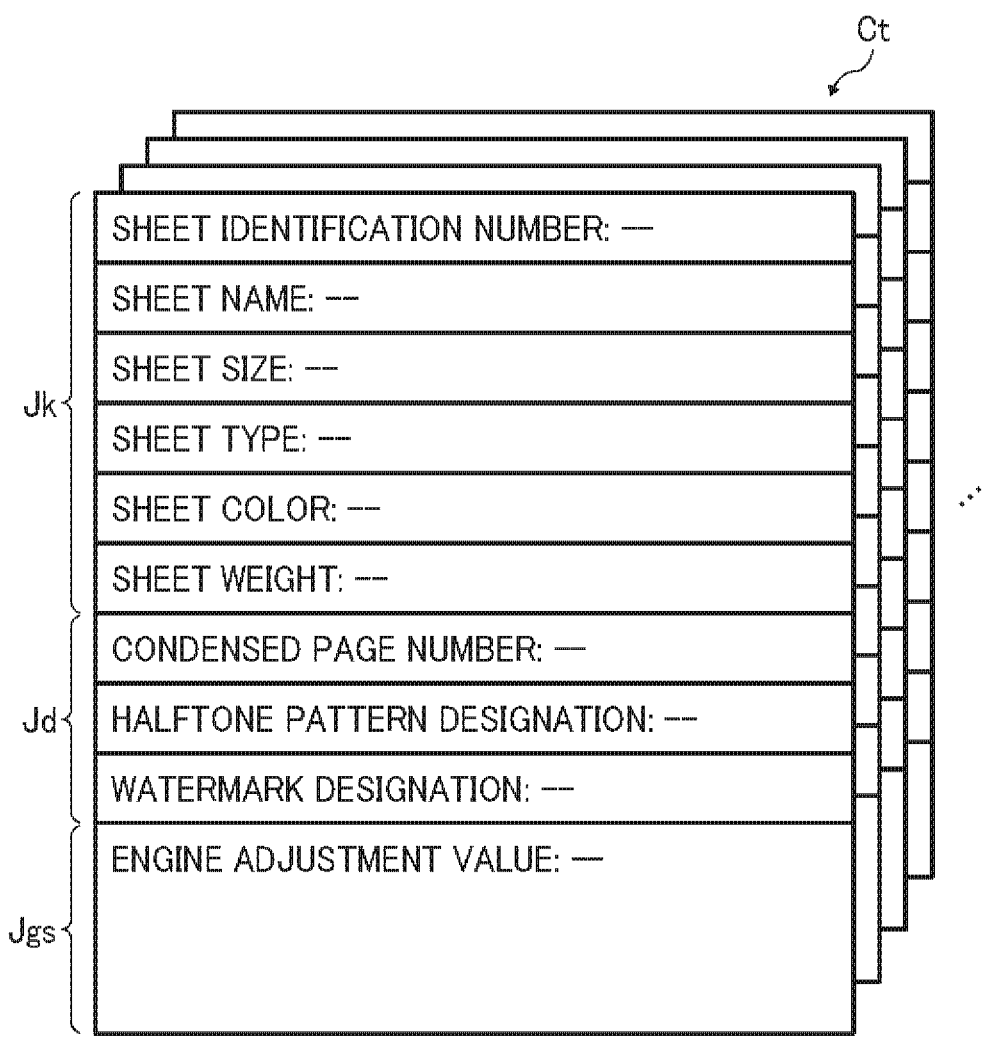
FIG. 7 is an example of an integrated sheet information database.

FIG. 7 is an example of an integrated sheet information database of one or more example embodiments of the present invention. The integrated sheet information database "Ct" includes, for example, the sheet attribution information "Jk," the image processing setting information "Jd," and the engine adjustment value information "Jgs" as collected or integrated information. Since the sheet attribution information "Jk" and the image processing setting information "Jd" are described above with reference to FIG. 5, the description of the sheet attribution information "Jk" and the image processing setting information "Jd" are omitted. The engine adjustment value information "Jgs" includes a parameter such as "engine adjustment value." The "engine adjustment value" is consisted with values of parameters set for the engine adjustment information "Jg" (FIG. 6). Specifically, the engine adjustment value information "Jgs" is a list of values of parameters of the engine adjustment information "Jg" arranged with the order of the parameters set for the engine adjustment information "Jg" shown in FIG. 6. In other words, the engine adjustment value information "Jgs" can be prepared by collecting the values of parameters set for the engine adjustment information "Jg" as a combined information list. Further, since the engine adjustment value information "Jgs" is correlated with the sheet attribution information "Jk," the engine adjustment value information "Jgs" may include the "sheet identification number." Hereinafter, information including the sheet attribution information "Jk," the image processing setting information "Jd," and the engine adjustment value information "Jgs" are collectively referred to "integrated sheet information," and it is assumed that the integrated sheet information database "Ct" stores the "integrated sheet information" for each of the sheet identification numbers.

A description is given of examples of sheet information database shown in FIGS. 5 to 7 with reference to FIGS. 8 to 10. FIG. 8 is an example of the sheet information databases storable in the DFE apparatus 2. FIG. 8A is DFE-side sheet information "Cd-1" having the sheet identification number of "1," and FIG. 8B is DFE-side sheet information "Cd-2" having the sheet identification number of "2."

As to the DFE-side sheet information "Cd-1" (FIG. 8A), the sheet attribution information "Jk-1" registers the sheet name as "A3 bookbinding paper," the sheet size as "A3," the sheet type as "plain paper," the sheet color as "white," and the sheet weight as "76 g/m$^2$," and the image processing setting information "Jd-1" registers the condensed page number as "2," the halftone pattern designation as "text mode," and the watermark designation as "logo." As to the DFE-side sheet information "Cd-2" (FIG. 8B), the sheet attribution information "Jk-2" registers the sheet name as "A3 bookbinding cover sheet," the sheet size as "A3," the sheet type as "thick paper," the sheet color as "blue," and the sheet weight as "123 g/m$^2$," and the image processing setting information "Jd-2" registers the condensed page number as "2," the halftone pattern designation as "graphic mode," and the watermark designation as "none."

FIG. 9 is an example of the sheet information database storable in the image output apparatus 3. FIG. 9A is output-side sheet information "Cg-1" having the sheet identification number of "1," and FIG. 9B is output-side sheet information "Cg-2" having the sheet identification number of "2." As to the output-side sheet information "Cg-1" (FIG. 9A), the sheet identification number of "1" of the sheet attribution information "Jk-1" in the output-side sheet information "Cg-1" (FIG. 9A) is identical to the sheet identification number of "1" of the sheet attribution information "Jk-1" in the DFE-side sheet information "Cd-1" (FIG. 8A). Therefore, the sheet attribution information "Jk-1" in the output-side sheet information "Cg-1" (FIG. 9A) and the sheet attribution information "Jk-1" in the DFE-side sheet information "Cd-1" (FIG. 8A) are the same information. As to the output-side sheet information "Cg-1" (FIG. 9A), the engine adjustment information "Jg-1" registers the fusing temperature as "200 Celsius degrees," the print position correction as "x=0 dot, y=0 dot," and the toner adhesion amount correction as "standard." Further, as to the output-side sheet information "Cg-2" (FIG. 9B), the sheet identification number of "2" of the sheet attribution information "Jk-2" in the output-side sheet information "Cg-2" (FIG. 9B) is identical to the sheet identification number of "2" of the sheet attribution information "Jk-2" in the DFE-side sheet information "Cd-2" (FIG. 8B). Therefore, the sheet attribution information "Jk-2" in the output-side sheet information "Cg-2" (FIG. 9B) and the sheet attribution information "Jk-2" in the DFE-side sheet information "Cd-2" (FIG. 8B) are the same information. As to the output-side sheet information "Cg-2" (FIG. 9B), the engine adjustment information "Jg-2" registers the fusing temperature as "220 Celsius degrees," the print position correction as "x=0 dot, y=0 dot," and the toner adhesion amount correction as "standard."

FIG. 10 is an example of the integrated sheet information database, in which FIG. 10A is integrated sheet information "Ct-1" having the sheet identification number of "1," and FIG. 10B is integrated sheet information "Ct-2" having the sheet identification number of "2." As to the integrated sheet integrated sheet information "Ct-1" (FIG. 10A), the sheet attribution information "Jk-1" in the integrated sheet integrated sheet information "Ct-1" (FIG. 10A) is the same information of the sheet attribution information "Jk-1" in the DFE-side sheet information "Cd-1" (FIG. 8A) and the sheet attribution information "Jk-1" in the output-side sheet information "Cg-1" (FIG. 9A). Further, the image processing setting information "Jd-1" in the integrated sheet integrated sheet information "Ct-1" (FIG. 10A) is the same information of the image processing setting information "Jd-1" in the DFE-side sheet information "Cd-1" (FIG. 8A). Further, the engine adjustment value information "Jgs-1" in the integrated sheet integrated sheet information "Ct-1" (FIG. 10A) is a list of values of parameters set for the engine adjustment information "Jg-1" included in the output-side sheet information "Cg-1" (FIG. 9A). In an example case of FIG. 10A, (200, 0, 0, standard) is registered as the engine adjustment value information "Jgs-1."

Further, as to the integrated sheet integrated sheet information "Ct-2" (FIG. 10B), the sheet attribution information "Jk-2" in the integrated sheet information "Ct-2" (FIG. 10B) is the same information of the sheet attribution information "Jk-2" in the DFE-side sheet information "Cd-2" (FIG. 8B) and the sheet attribution information "Jk-2" in the output-side sheet information "Cg-2" (FIG. 9B), and the image processing setting information "Jd-2" in the integrated sheet information "Ct-2" (FIG. 10B) is the same information of the image processing setting information "Jd-2" in the DFE-side sheet information "Cd-2" (FIG. 8B). Further, the engine adjustment value information "Jgs-2" in the integrated sheet integrated sheet information "Ct-2" (FIG. 10B) is a list of values of parameters set for the engine adjustment information "Jg-2" included in the output-side sheet information "Cg-2" (FIG. 9B). In an example case of FIG. 10B, (220, 0, 0, standard) is registered as the engine adjustment value information "Jgs-2."

A description is given of functional configurations of the DFE apparatus 2 and the image output apparatus 3 of the image forming system 1 of one or more example embodiments of the present invention with reference to FIG. 11. FIG. 11 is a functional configuration of the DFE apparatus 2 and the image output apparatus 3. The image forming system 1 can configure the functional configuration of the DFE apparatus 2 and the image output apparatus of FIG. 11 when the program used for managing the print setting information is executed.

As shown in FIG. 11, the DFE apparatus 2 includes, for example, an image processing setting information input unit 51, a sheet attribution information input unit 52, a DFE-side storage 53, a DFE-side storage controller 54, a synchronization unit 55, an integrated sheet information storage 56, an integrated sheet information generator 57, a storage destination controller 58, a restoration controller 59, and a storage medium connection unit 60. As to the one or more example embodiments of the present invention, the sheet information management processing unit 210 (FIG. 1) can include the synchronization unit 55, the integrated sheet information storage 56, the integrated sheet information generator 57, the storage destination controller 58, the restoration controller 59, and the storage medium connection unit 60.

Further, as shown in FIG. 11, the image output apparatus 3 includes, for example, an engine adjustment information input unit 71, an output-side storage 72, and an output-side storage controller 73. The engine adjustment information input unit 71 can be configured or implemented by the operation display unit 12 of the image output apparatus 3. The engine adjustment information input unit 71 is used to input the engine adjustment information "Jg" to the engine unit 11, which performs an image forming process to image data processed by the DFE apparatus 2 based on the engine adjustment information "Jg." The engine adjustment information "Jg" corresponds to image-formation processing contents used for the image forming process. Therefore, the engine adjustment information input unit 71 can be used as an engine adjustment information input unit.

The output-side storage 72 can be configured or implemented by the non-volatile memory 24 of the image output apparatus 3. The output-side storage 72 stores the engine adjustment information "Jg" and the sheet attribution information "Jk." Therefore, the output-side storage 72 can be used as a storing unit of the image output apparatus 3.

The output-side storage controller 73 can be configured or implemented by the CPU 21 of the image output apparatus 3. The output-side storage controller 73 stores the engine adjustment information "Jg" input from the engine adjustment information input unit 71 to the output-side storage 72. Further, the output-side storage controller 73 generates the engine adjustment value information "Jgs" from the engine adjustment information "Jg," in which the engine adjustment value information "Jgs" is generated as a list of values of parameters of the engine adjustment information "Jg" arranged with the order of the parameters set for the engine adjustment information "Jg" shown in FIG. 6. Then, the output-side storage controller 73 transmits the engine adjustment value information "Jgs" to the DFE apparatus 2. Therefore, the output-side storage controller 73 can be used as a storing unit controller of the image output apparatus 3.

The image processing setting information input unit 51 can be configured or implemented by the input device 41 of the DFE apparatus 2. The image processing setting information input unit 51 is input with image processing setting information indicating image processing contents to image data. Therefore, the image processing setting information input unit 51 can be used as an image processing setting information input unit.

In an example configuration of FIG. 11, the sheet attribution information input unit 52 is configured or implemented in the DFE apparatus 2, but the sheet attribution information input unit 52 can be configured or implemented by any one of the input device 41 of the DFE apparatus 2, and the operation display unit 12 of the image output apparatus 3. The sheet attribution information input unit 52 is input with the sheet attribution information "Jk" that is shared by the DFE apparatus 2 and the image output apparatus 3. Therefore, the sheet attribution information input unit 52 can be used as sheet attribution information input unit. Further, if the sheet attribution information input unit 52 is configured or implemented by the operation display unit 12 of the image output apparatus 3, the output-side storage controller 73 stores the sheet attribution information "Jk," input from the sheet attribution information input unit 52, to the output-side storage 72.

The DFE-side storage 53 can be configured or implemented by the non-volatile memory 34 of the DFE apparatus 2. The DFE-side storage 53 can be written with the image processing setting information "Jd" input from the image processing setting information input unit 51, and the sheet attribution information "Jk" input from the sheet attribution information input unit 52 by the DFE-side storage controller 54. Therefore, the DFE-side storage 53 can be used as a storing unit of the DFE apparatus 2.

The DFE-side storage controller 54 can be configured or implemented by the CPU 31 of the DFE apparatus 2. The DFE-side storage controller 54 stores the image processing setting information "Jd" input from the image processing setting information input unit 51, and the sheet attribution information "Jk" input from the sheet attribution information input unit 52 to the DFE-side storage 53. Therefore, the DFE-side storage controller 54 can be used as a storing unit controller of the DFE apparatus 2.

The synchronization unit 55 can be configured or implemented by the CPU 31 of the DFE apparatus 2. The synchronization unit 55 can synchronize the sheet attribution information "Jk" and the image processing setting information "Jd" stored in the DFE-side storage 53, and the sheet attribution information "Jk" and the engine adjustment information "Jg" stored in the output-side storage 72 based on the sheet identification number. Therefore, the synchronization unit 55 can be used as a synchronizer. For example, when at least one of the image processing setting information "Jd," the engine adjustment information "Jg," and the sheet attribution information "Jk" is changed, the synchronization unit 55 synchronizes the image processing setting information "Jd," the engine adjustment information "Jg," and the sheet attribution information "Jk" stored in different databases based on the change of information.

The integrated sheet information generator 57 can generate the integrated sheet information database "Ct" by collecting or integrating the image processing setting information "Jd," the engine adjustment information "Jg," and the sheet attribution information "Jk" based on the sheet identification number. Specifically, the integrated sheet information generator 57 includes an acquisition unit 571, a referring unit 572, and a generation unit 573. The acquisition unit 571 acquires the output-side sheet information such as "Cg-1" and "Cg-2" correlating the sheet attribution information "Jk" and the engine adjustment information "Jg" from the image output apparatus 3. The referring unit 572 refers the DFE-side sheet information such as "Cd-1" and "Cd-2" correlating the sheet attribution information "Jk" and the image processing setting information "Jd" stored in the DFE-side storage 53. The generation unit 573 generates integrated sheet information correlating the sheet attribution information "Jk," the image processing setting information "Jd," and the engine adjustment information "Jg" from the output-side sheet information such as "Cg-1" and "Cg-2" acquired by the acquisition unit 571, and the DFE-side sheet information such as "Cd-1" and "Cd-2" referred by the referring unit 572. In an example configuration of FIG. 11, the integrated sheet information generator 57 is configured or implemented by in the DFE apparatus 2, but the integrated sheet information generator 57 can be configured or implemented by any one of the CPU 31 of the DFE apparatus 2, and the CPU 21 of the image output apparatus 3. As to the one or more example embodiments of the present invention, the integrated sheet information generator 57 is configured or implemented by the CPU 31 of the DFE apparatus 2, but the integrated sheet information generator 57 can be configured or implemented by the CPU 21 of the image output apparatus 3. Further, the acquisition unit, the referring unit, and the generation unit can be included as parts disposed in the integrated sheet information generator 57 as above described, but not limited hereto. For example, each of the acquisition unit, the referring unit, and the generation unit can be disposed independently from the integrated sheet information generator 57.

In an example configuration of FIG. 11, the integrated sheet information storage 56 is configured or implemented in the DFE apparatus 2, but the integrated sheet information storage 56 can be configured or implemented by any one of the volatile memory (RAM 33) of the DFE apparatus 2, and the volatile memory (RAM 23) of the image output apparatus 3. The integrated sheet information storage 56 can be written with the integrated sheet information database "Ct" by the integrated sheet information generator 57, and stores the integrated sheet information database "Ct.". Therefore, the integrated sheet information storage 56 can be used as an integrated sheet information storing unit. As to the one or more example embodiments of the present invention, the integrated sheet information storage 56 is configured or implemented by the volatile memory provided to the DFE apparatus 2, but the integrated sheet information storage 56 can be configured or implemented by the volatile memory provided to the image output apparatus 3.

In an example configuration of FIG. 11, the storage medium connection unit 60 is configured or implemented in the DFE apparatus 2, but the storage medium connection unit 60 can be configured or implemented by any one of the external I/F 37 of the DFE apparatus 2, and the external I/F 28 of the image output apparatus 3. The storage medium connection unit 60 can be connected or coupled to the portable storage medium Mk detachably. Therefore, the storage medium connection unit 60 can be used as a connection unit of a storage medium.

In an example configuration of FIG. 11, the storage destination controller 58 is configured or implemented in the DFE apparatus 2, but the storage destination controller 58 can be configured or implemented by any one of the CPU 31 of the DFE apparatus 2, and the CPU 21 of the image output apparatus 3. The storage destination controller 58 can transfer and store the integrated sheet information database "Ct" already stored in the integrated sheet information storage 56 to the portable storage medium Mk connected or coupled to the storage medium connection unit 60. Therefore, the storage destination controller 58 can be used as a storage destination controller. As to the one or more example embodiments of the present invention, the storage destination controller 58 is configured or implemented by the CPU 31 of the DFE apparatus 2, but the storage destination controller 58 can be configured or implemented by the CPU 21 of the image output apparatus 3.

In an example configuration of FIG. 11, the restoration controller 59 is configured or implemented in the DFE apparatus 2, but the restoration controller 59 can be configured or implemented by any one of the CPU 31 of the DFE apparatus 2, and the CPU 21 of the image output apparatus 3. The restoration controller 59 reads out the integrated sheet information database "Ct" stored in the portable storage medium Mk, connected or coupled to the storage medium connection unit 60, and restores the integrated sheet information database "Ct" in the integrated sheet information storage 56 by using the read integrated sheet information database "Ct." Further, based on the integrated sheet information database "Ct" read out from the portable storage medium Mk, the restoration controller 59 restores the image processing setting information "Jd" and the sheet attribution information "Jk" in the DFE-side storage 53, and restores the engine adjustment information "Jg" and the sheet attribution information "Jk" in the output-side storage 72. Therefore, the restoration controller 59 can be used as a restoration controller. As to the one or more example embodiments of the present invention, the restoration controller 59 is configured or implemented by the CPU 31 of the DFE apparatus 2, but the restoration controller 59 can be configured or implemented by the CPU 21 of the image output apparatus 3.

Figure 12:
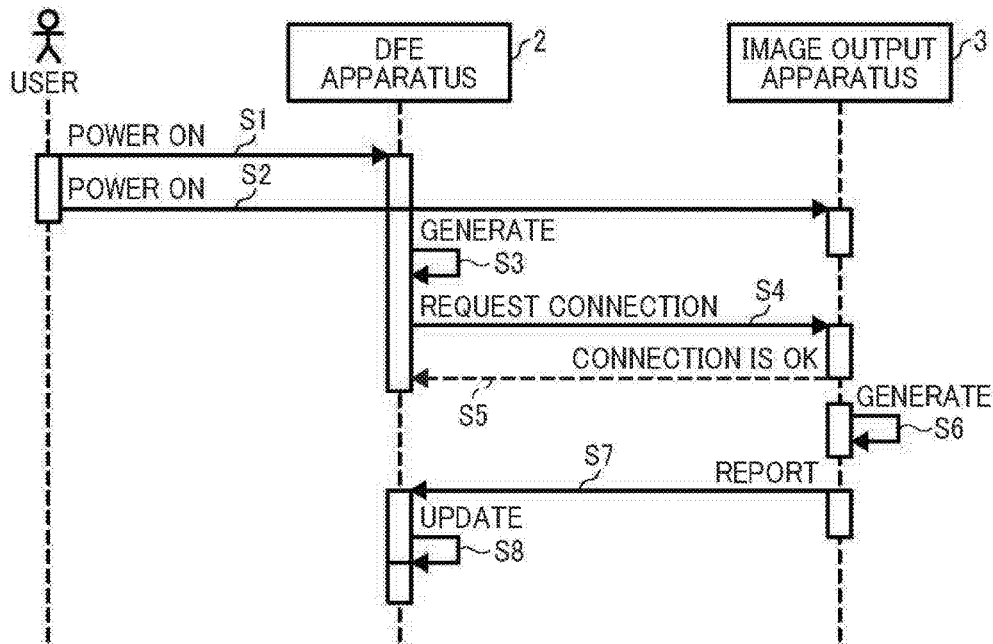
FIG. 12 is a sequential chart for generating an integrated sheet information database in the image forming system.

A description is given of an operation of the image forming system 1 of one or more example embodiments of the present invention with reference to FIG. 12, in which the image forming system 1 can easily manage the image processing setting information "Jd," the engine adjustment information "Jg," and the sheet attribution information "Jk."

FIG. 12 is a sequential chart for generating the integrated sheet information database in the image forming system 1. In the image forming system 1, the DFE-side storage 53 stores the first sheet information database "Cd" including the sheet attribution information "Jk" and the image processing setting information "Jd." Further, in the image forming system 1, the output-side storage 72 stores the second sheet information database "Cg" including the sheet attribution information "Jk" and the engine adjustment information "Jg." When the power supply to the DFE apparatus 2 and the image output apparatus 3 is turned ON from OFF in the image forming system 1, the image forming system 1 (i.e., DFE apparatus 2, image output apparatus 3) is activated, and the image forming system 1 performs a generation process of the integrated sheet information database "Ct" as illustrated in FIG. 12. In this case, it is assumed that the first sheet information database "Cd" is already stored in the non-volatile memory in the DFE apparatus 2, and the second sheet information database "Cg" is already stored in the non-volatile memory in the image output apparatus 3.

When a user turns the power supply to the DFE apparatus 2 and the image output apparatus 3 to ON (steps S1 and S2), at the DFE apparatus 2, the integrated sheet information generator 57 acquires the first sheet information database "Cd" stored in the DFE-side storage 53, and generates an initial integrated sheet information database "Ct" in the integrated sheet information storage 56 (step S3). At this stage, only the sheet attribution information "Jk" including the sheet identification number, and the image processing setting information "Jd" are registered as the initial integrated sheet information database "Ct" but not including the engine adjustment value information "Jgs," which is different from the integrated sheet information database "Ct" shown in FIG. 7 including the sheet attribution information "Jk," the image processing setting information "Jd", and the engine adjustment value information "Jgs."

Then, at the DFE apparatus 2, the integrated sheet information generator 57 issues a connection request to the image output apparatus 3 (step S4).

When the image output apparatus 3 receives the connection request from the DFE apparatus 2 (step S4), the output-side storage controller 73 can transmit a response of accepting the connection with the DFE apparatus 2 (step S5). Then, the output-side storage controller 73 generates the engine adjustment value information "Jgs" from the engine adjustment information "Jg" (step S6), and the output-side storage controller 73 transmits the engine adjustment value information "Jgs" to the DFE apparatus 2 (step S7). Since the engine adjustment information "Jg" is correlated with the sheet attribution information "Jk" as shown in FIG. 6, when the output-side storage controller 73 generates the engine adjustment value information "Jgs" from the engine adjustment information "Jg" at step S6, the sheet identification number set in the sheet attribution information "Jk" can be attached to the generated engine adjustment value information "Jgs."

When the DFE apparatus 2 acquires the engine adjustment value information "Jgs" from the image output apparatus 3, the integrated sheet information generator 57 correlates the engine adjustment value information "Jgs," and the sheet attribution information "Jk" having the sheet identification number identical to the sheet identification number attached to the engine adjustment value information "Jgs" at the integrated sheet information database "Ct," which means that the integrated sheet information generator 57 generates the integrated sheet information database "Ct" shown in FIG. 7 including the sheet attribution information "Jk," the image processing setting information "Jd", and the engine adjustment value information "Jgs." In other words, the integrated sheet information generator 57 stores values of the "engine adjustment value" to the initial integrated sheet information database "Ct" generated at step S3 to update the integrated sheet information database "Ct" (step S8). The integrated sheet information generator 57 performs the correlating process that correlates the engine adjustment value information "Jgs" for all of the DEF-side sheet information and the output-side sheet information such as the DEF-side sheet information stored in the first sheet information database "Cd" and the output-side sheet information stored in the second sheet information database "Cg." In other words, the integrated sheet information generator 57 correlates the engine adjustment values for all of the sheet identification numbers included in the integrated sheet information database "Ct" and the second sheet information database "Cg."

A description is given of an example processing of FIG. 12 with reference to FIGS. 8 to 10. Specifically, when the DFE apparatus 2 is activated, it is assumed that the DFE-side sheet information "Cd-1" and "Cd-2" (FIG. 8) are already stored in the first sheet information database "Cd" in the DFE apparatus 2, and the output-side sheet information "Cg-1" and "Cg-2" (FIG. 9) are already stored in the second sheet information database "Cg" of the image output apparatus 3. In this example case, at the DFE apparatus 2, the integrated sheet information generator 57 acquires the DFE-side sheet information "Cd-1" and "Cd-2," and retains or stores the DFE-side sheet information "Cd-1" and "Cd-2" in the integrated sheet information storage 56. Then, the integrated sheet information generator 57 issues a connection request to the image output apparatus 3. When the image output apparatus 3 is communicably connected or coupled to the DFE apparatus 2, it is checked whether the sheet identification number of the sheet attribution information "Jk-1" in the DFE-side sheet information "Cd-1" and the sheet identification number of the sheet attribution information "Jk-2" in the DFE-side sheet information "Cd-2" are respectively identical to the sheet identification number of the sheet attribution information "Jk-1" in the output-side sheet information "Cg-1" and the sheet identification number of the sheet attribution information "Jk-2" in the output-side sheet information "Cg-2." If the sheet identification numbers are respectively identical, the image output apparatus 3 generates the engine adjustment value information "Jgs-1" and "Jgs-2" (FIG. 10) respectively from the output-side sheet information "Cg-1" and "Cg-2" (FIG. 9) respectively including the sheet attribution information "Jk-1" and "Jk-2" respectively having the identical sheet identification number.

Then, the image output apparatus 3 transmits the generated engine adjustment value information "Jgs-1" and "Jgs-2" to the DFE apparatus 2. After receiving the engine adjustment value information "Jgs-1" and "Jgs-2" from the image output apparatus 3, at the DFE apparatus 2, the integrated sheet information generator 57 correlates the engine adjustment value information "Jgs-1" to the DFE-side sheet information "Cd-1" retained or stored in the integrated sheet information storage 56 to generate the integrated sheet information "Ct-1" (FIG. 10A). Further, the integrated sheet information generator 57 correlates the engine adjustment value information "Jgs-2" to the DFE-side sheet information "Cd-2" to generate the integrated sheet information "Ct-2" (FIG. 10B) similar to the integrated sheet information "Ct-1." Then, the integrated sheet information generator 57 stores the integrated sheet information "Ct-1" and "Ct-2" (FIGS. 10A and 10B) as the integrated sheet information database "Ct" in the integrated sheet information storage 56. As to the one or more example embodiments of the present invention, the integrated sheet information database "Ct" can be generated as above described.

Therefore, when the power is supplied to the DFE apparatus 2 and the image output apparatus 3, the integrated sheet information database "Ct" synchronized to the first sheet information database "Cd" and the second sheet information database "Cg" can be generated. Further, as to the one or more example embodiments of the present invention, the engine adjustment information "Jg" set for the image output apparatus 3 can be prepared as the engine adjustment value information "Jgs," which is a list of values of parameters of the engine adjustment information "Jg" arranged with the order of the parameters set for the engine adjustment information "Jg" shown in FIG. 6, with which even if one or more parameters configuring the engine adjustment information "Jg" are changed, the engine adjustment information "Jg" can be managed easily.

As to the one or more example embodiments of the present invention, the engine adjustment information "Jg" includes three parameters, but the engine adjustment information "Jg" may include a greater number of parameters actually because an actual image output apparatus requires a greater number of settings for image forming operation, and thereby the amount of parameters becomes greater. Therefore, if the entire of the engine adjustment information "Jg" is stored as they are, and the number of parameters configuring the engine adjustment information "Jg" increases or decreases, the entire of the engine adjustment information "Jg" are required to be updated each time the increase or decrease occurs, in which the processing load becomes too heavy.

As to the one or more example embodiments of the present invention, the engine adjustment information "Jg" can be transformed to the engine adjustment value information "Jgs," which is a list of values of parameters of the engine adjustment information "Jg" arranged with the order of the parameters set for the engine adjustment information "Jg" shown in FIG. 6, with which the engine adjustment information "Jg" can be processed as a simple digit row, digit string, or numeric string without considering the increase or decrease the number of the parameters configuring the engine adjustment information "Jg," with which information load required for the processing can be reduced. Therefore, the engine adjustment information "Jg" can be easily managed at the DFE apparatus 2. Therefore, as to the one or more example embodiments of the present invention, the integrated sheet information correlating the sheet attribution information "Jk," the image processing setting information "Jd," and the engine adjustment information "Jg" can be easily managed.

Figure 13:
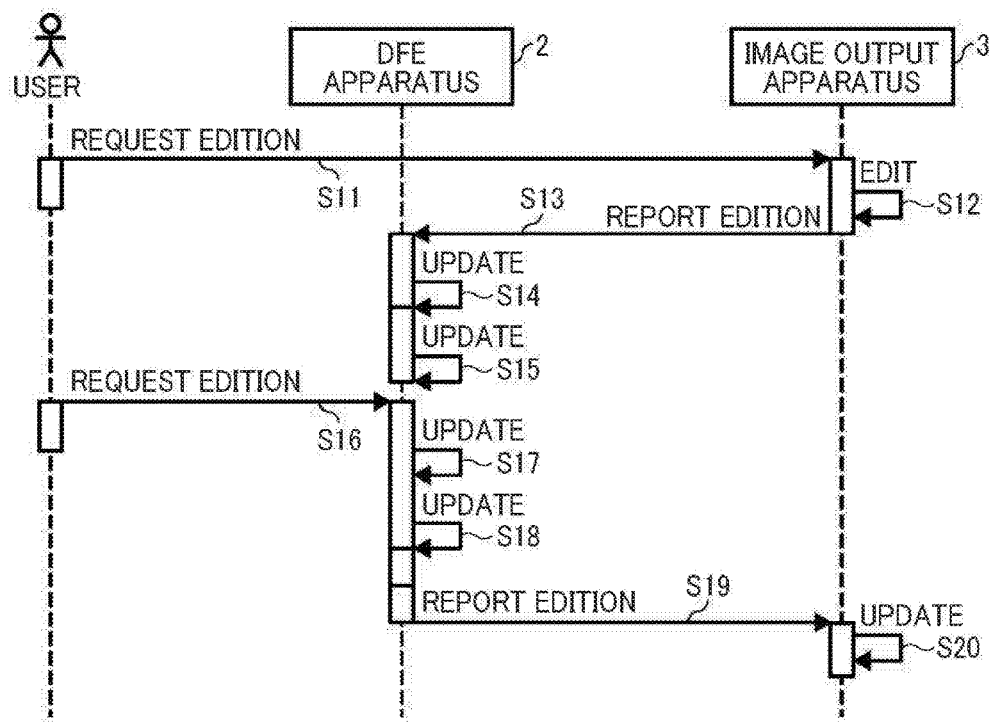
FIG. 13 is a first sequential chart of updating databases in the image forming system.

Then, when the integrated sheet information database "Ct" is already prepared or generated in the image forming system 1, and a user inputs an edition request (edition operation) of the first sheet information database "Cd" and the second sheet information database "Cg", an edition (or updating) of each of the databases can be performed as illustrated in FIG. 13. FIG. 13 is a first sequential chart of updating each of the databases in the image forming system 1.

A description is given of a case when an edition request of the second sheet information database "Cg" is issued to the image output apparatus 3 with reference to FIG. 13. When the image output apparatus 3 receives the edition request of the second sheet information database "Cg" (step S11), the image output apparatus 3 edits the second sheet information database "Cg" corresponding to the edition request (step S12). Hereinafter, a description is given of the edition request of the second sheet information database "Cg." After receiving the edition request from the engine adjustment information input unit 71, the image output apparatus 3 changes values of one or more parameters, which are the target of the edition request, included in the engine adjustment information "Jg" stored in the second sheet information database "Cg" to one or more new values input with the edition request.

Further, if the image output apparatus 3 includes the sheet attribution information input unit 52, the image output apparatus 3 receives the edition request via the sheet attribution information input unit 52, and then the image output apparatus 3 changes the values of one or more parameters, which are the target of the edition request, included in the sheet attribution information "Jk" stored in the second sheet information database "Cg," to one or more new values input with the edition request. Therefore, at the image output apparatus 3, the output-side storage controller 73 edits the sheet attribution information "Jk" and the engine adjustment information "Jg" included in the second sheet information database "Cg" stored in the output-side storage 72 corresponding to the edition request. After editing the second sheet information database "Cg," the image output apparatus 3 reports the edition information, and the updating of the second sheet information database "Cg" to the DFE apparatus 2 (step S13). Specifically, the image output apparatus 3 reports the updating of the second sheet information database "Cg," the sheet identification number of the output-side sheet information that is edited, and the one or more target parameters that have changed the values, and the values of the one or more target parameters after changing the values to the DFE apparatus 2. In this case, if the edited parameter that has changed the value is a parameter included in the engine adjustment information "Jg," the image output apparatus 3 transmits the updating report, the engine adjustment value information "Jgs" applied with the editing, and the sheet identification number of the output side sheet information including the concerned engine adjustment information "Jg" to the DFE apparatus 2 as the edition information.

When the DFE apparatus 2 receives the updating report of the second sheet information database "Cg," under the control of the synchronization unit 55, the DFE-side storage controller 54 updates the first sheet information database "Cd" stored in the DFE-side storage 53 based on the reported edition information (step S14). Specifically, when one or more parameters included in the sheet attribution information "Jk" are edited, the synchronization unit 55 edits the first sheet information database "Cd." The synchronization unit 55 updates the DFE side sheet information having the sheet identification number identical to the sheet identification number received with the updating report. Specifically, when the DFE side sheet information includes a parameter corresponding to the "target parameter that has changed the value" included in the reported edition information, the synchronization unit 55 changes the value of the corresponding parameter to the "changed value of the target parameter" at the DFE side sheet information having the sheet identification number identical to the sheet identification number received with the updating report to update the first sheet information database "Cd."

Then, at the DFE apparatus 2, the integrated sheet information generator 57 edits the integrated sheet information database "Ct" stored in the integrated sheet information storage 56 (step S15). Specifically, when the first sheet information database "Cd" is updated, the integrated sheet information generator 57 updates the integrated sheet information database "Ct" same as the first sheet information database "Cd."

Further, when the reported edition information includes the engine adjustment value information "Jgs," the integrated sheet information generator 57 updates the engine adjustment value in the integrated sheet information at the integrated sheet information database "Ct" having the sheet identification number identical to the sheet identification number included in the engine adjustment value information "Jgs" included in the reported edition information to the engine adjustment value included in the engine adjustment value information "Jgs" at the integrated sheet information database "Ct" of the DFE apparatus 2.

As above described, when the sheet attribution information "Jk" is edited at the second sheet information database "Cg," both of the first sheet information database "Cd" and the integrated sheet information database "Ct" are updated. Further, when the engine adjustment information "Jg" is alone edited at the second sheet information database "Cg," the integrated sheet information database "Ct" is updated while the first sheet information database "Cd" is not updated.

A description is given of when an edition request of the first sheet information database "Cd" is issued to the DFE apparatus 2. When the DFE apparatus 2 receives the edition request via the image processing setting information input unit 51 and the sheet attribution information input unit 52 (step S16), the DFE-side storage controller 54 edits the sheet attribution information "Jk" and the image processing setting information "Jd" stored in the first sheet information database "Cd" corresponding to the edition request (step S17). Then, when the sheet attribution information "Jk" and the image processing setting information "Jd" stored in the first sheet information database "Cd" are edited at the DFE apparatus 2 (step S17), the integrated sheet information generator 57 edits the integrated sheet information database "Ct" stored in the integrated sheet information storage 56 based on the edition information (step S18).

Then, the DFE apparatus 2 uses the synchronization unit 55 to transmit an edition report to the image output apparatus 3 with the edition information (step S19). Specifically, when the sheet attribution information "Jk" in the first sheet information database "Cd" is edited, the synchronization unit 55 transmits the edition report to the image output apparatus 3. In this case, the edition information reported to the image output apparatus 3 with the edition report includes the sheet identification information included in the sheet attribution information "Jk," the target parameter that has changed the value, and the edited value of the target parameter in the sheet attribution information "Jk. When the image output apparatus 3 receives the edition report and the edition information, the output-side storage 72 edits the second sheet information database "Cg" (step S20). Specifically, the output-side storage 72 updates the sheet attribution information "Jk" having the sheet identification number identical to the sheet identification number included in the edition information at the second sheet information database "Cg."

A description is given of an example processing of FIG. 13 with reference to FIGS. 8 to 10. Specifically, it is assumed that a value of the "sheet size" included in the output-side sheet information "Cg-1" stored in the second sheet information database "Cg" is to be edited or changed from "A3" to "A4." In this case, the "sheet size" is a parameter included in the sheet attribution information "Jk." Therefore, the image output apparatus 3 transmits an edition report, the sheet identification number "1" included in the output-side sheet information "Cg-1," and edition information of the "sheet size" (i.e., A4) to the DFE apparatus 2. Since the target parameter edited by the edition information is the parameter included in the sheet attribution information "Jk," at the DFE apparatus 2, the synchronization unit 55 updates the value of the "sheet size" from "A3" to "A4" for the DFE-side sheet information "Cd-1" having the sheet identification number "1" identical to the sheet identification number "1" included in the output-side sheet information "Cg-1" at the first sheet information database "Cd." Further, the synchronization unit 55 updates the value of the "sheet size" from "A3" to "A4" for the integrated sheet information "Ct-1" having the sheet identification number "1" identical to the sheet identification number "1" of the output-side sheet information "Cg-1" at the integrated sheet information database "Ct."

A description is given of a case that a value of the "fusing temperature" included in the output-side sheet information "Cg-1" stored in the second sheet information database "Cg" is edited or changed from "200 Celsius degrees" to "210 Celsius degrees." In this case, since the edited target parameter is a parameter included in the engine adjustment information "Jg-1," the image output apparatus 3 outputs or transmits the engine adjustment value information "Jgs-1" applied with the edition, and the sheet identification number "1" included in the output-side sheet information "Cg-1" to the DFE apparatus 2 with the edition report. Specifically, the image output apparatus 3 outputs the engine adjustment value (210, 0, 0, standard) to the DFE apparatus 2. Since the edition information is the engine adjustment value, the DFE apparatus 2 does not edit the first sheet information database "Cd." At the DFE apparatus 2, the synchronization unit 55 updates the value of the "engine adjustment value" stored in the integrated sheet information "Ct-1" having the sheet identification number "1" identical to the sheet identification number "1" received with the edition report from (200, 0, 0, standard) to (210, 0, 0, standard) at the integrated sheet information database "Ct."

A description is given of a case that a value of the "sheet size" included in the DFE-side sheet information "Cd-1" stored in the first sheet information database "Cd" is edited or changed from "A3" to "A4." In this case, at the DFE apparatus 2, the synchronization unit 55 updates the value of the "sheet size" from "A3" to "A4" for the integrated sheet information "Ct-1" having the sheet identification number identical to the sheet identification number of the DFE-side sheet information "Cd-1" at the integrated sheet information database "Ct." Then, the DFE apparatus 2 transmits the edition report, and the edition information including the sheet identification number "1" and the "sheet size" (i.e., A4) to the image output apparatus 3. When the image output apparatus 3 receives the edition report, the image output apparatus 3 updates the value of the "sheet size" from "A3" to "A4" for the output-side sheet information "Cg-1" having the sheet identification number"1" identical to the sheet identification number "1" included in the DFE-side sheet information "Cd-1" at the second sheet information database "Cg."

A description is given of a case that a value of the "condensed page number" included in the DFE-side sheet information "Cd-1" stored in the first sheet information database "Cd" is edited or changed from "2" to "4." The "condensed page number" is a parameter included in the image processing setting information "Jd-1." In this case, at the DFE apparatus 2, the synchronization unit 55 updates the value of the "condensed page number" for the integrated sheet information "Ct-1" having the sheet identification number identical to the sheet identification number of the DFE-side sheet information "Cd-1" from "2" to "4" at the integrated sheet information database "Ct," and does not transmit the edition report to the image output apparatus 3.

As to the above described the image forming system 1, when the editing process is performed at any one of the DFE apparatus 2 and the image output apparatus 3 such as when the editing process such as the changing process is performed for any one of the first sheet information database "Cd" and the second sheet information database "Cg," the other one of the first sheet information database "Cd" and the second sheet information database "Cg" and the integrated sheet information database "Ct" can be edited to synchronize the data or information. Therefore, as to the image forming system 1, the first sheet information database "Cd," the second sheet information database "Cg," and the integrated sheet information database "Ct" can be synchronized consistently Further, when the integrated sheet information database "Ct" is already prepared or generated in the image forming system 1, and a user inputs an addition request (addition operation) of sheet information, an addition process of sheet information is performed as illustrated in FIG. 14. FIG. 14 is a second sequential chart of updating each of the databases in the image forming system 1.

A description is given of a case when an addition request of the output-side sheet information to the second sheet information database "Cg" is issued to the image output apparatus 3 with reference to FIG. 14. When the engine adjustment information input unit 71 receives the addition request of the output-side sheet information (step S21), the image output apparatus 3 performs an addition process of the output-side sheet information (step S21). Further, if the image output apparatus 3 includes the sheet attribution information input unit 52, the image output apparatus 3 performs the addition process of the output-side sheet information when the sheet attribution information input unit 52 receives the addition request of the output-side sheet information (step S21).

At the image output apparatus 3, the output-side storage controller 73 registers the output-side sheet information including the sheet attribution information "Jk" and the engine adjustment information "Jg" corresponding to the addition request to the second sheet information database "Cg" stored in the output-side storage 72 to update the second sheet information database "Cg" (step S22). Specifically, for example, when the image output apparatus 3 receives the addition request of the sheet attribution information "Jk" and the engine adjustment information "Jg" for the second sheet information database "Cg," the image output apparatus 3 adds the output-side sheet information correlating the sheet attribution information "Jk" and the engine adjustment information "Jg" to the second sheet information database "Cg."

Further, when the image output apparatus 3 receives the addition request of the sheet attribution information "Jk" alone, the image output apparatus 3 sets pre-set initial values as the values of parameters set for the engine adjustment information "Jg" based on the value of the sheet attribution information "Jk." Then, the image output apparatus 3 adds the output-side sheet information correlating the sheet attribution information "Jk" and the engine adjustment information "Jg" to the second sheet information database "Cg." Further, if one or more parameters not set with values exist in the sheet attribution information "Jk," the image output apparatus 3 can set an initial value to the concerned one or more parameters, in which the image output apparatus 3 can retain the initial value in advance. Then, the image output apparatus 3 transmits the sheet attribution information "Jk" and the engine adjustment value included in the added output-side sheet information, and an addition report of the output-side sheet information to the DFE apparatus 2 (step S23).

When the DFE apparatus 2 receives the addition report, under the control of the synchronization unit 55 and based on the addition report, the DFE-side storage controller 54 adds the DEF-side sheet information to the first sheet information database "Cd" stored in the DFE-side storage 53 (step S24). Specifically, when the DFE apparatus 2 acquires the added output-side sheet information, the DFE-side storage controller 54 correlates the sheet attribution information "Jk" included in the output-side sheet information, and the image processing setting information "Jd" setting the initial values to each of the parameters as new DEF-side sheet information, and adds the new DEF-side sheet information to the first sheet information database "Cd." Then, at the DFE apparatus 2, the integrated sheet information generator 57 adds the new integrated sheet information to the integrated sheet information database "Ct" stored in the integrated sheet information storage 56 (step S25). Specifically, at the DFE apparatus 2, the engine adjustment value information "Jgs" included in the output-side sheet information acquired from the image output apparatus 3 is correlated with the new DEF-side sheet information added to the first sheet information database "Cd" to generate the new integrated sheet information, and then the new integrated sheet information is added to the integrated sheet information database "Ct." A description is given of a case that the DEF-side sheet information is added at the DFE apparatus 2.

When the DFE apparatus 2 receives the addition request of the DEF-side sheet information via the image processing setting information input unit 51 and the sheet attribution information input unit 52 (step S26), the DFE-side storage controller 54 adds the DEF-side sheet information including the sheet attribution information "Jk" and the image processing setting information "Jd" corresponding to the addition request to the first sheet information database "Cd" (step S27). Further, if one or more parameters not set with values exist in the sheet attribution information "Jk" and the image processing setting information "Jd," the DFE apparatus 2 can set initial values to the concerned one or more parameters, in which the DFE apparatus 2 can retain the initial value in advance. Then, the DFE apparatus 2 uses the synchronization unit 55 to transmit the DEF-side sheet information added to the first sheet information database "Cd" and the addition report of the DEF-side sheet information to the image output apparatus 3 (step S28).

When the image output apparatus 3 receives the addition report from the DFE apparatus 2 (step S28), the image output apparatus 3 adds the output-side sheet information corresponding to the DEF-side sheet information acquired from the DFE apparatus 2 to the second sheet information database "Cg" stored in the output-side storage 72 (step S29). Specifically, the image output apparatus 3 correlates the sheet attribution information "Jk" included in the DEF-side sheet information acquired from the DFE apparatus 2, and the engine adjustment information "Jg" setting initial values to each of parameters to generate new output-side sheet information, and adds new output-side sheet information to the second sheet information database "Cg" to update the second sheet information database "Cg." After the image output apparatus 3 updates the second sheet information database "Cg," the image output apparatus 3 transmits the added output-side sheet information, and an addition response of the output-side sheet information to the DFE apparatus 2 (step S30), in which the image output apparatus 3 outputs the information-added sheet attribution information "Jk," and the engine adjustment value information "Jgs" generated from the engine adjustment information "Jg" to the DFE apparatus 2 as the output-side sheet information. When the DFE apparatus 2 receives the addition response from the image output apparatus 3, the DFE apparatus 2 correlates the output-side sheet information acquired from the image output apparatus 3, and the image processing setting information "Jd" having the sheet identification number identical to the sheet identification number included in the output-side sheet information as new integrated sheet information, and adds the new integrated sheet information to the integrated sheet information database "Ct." (step S31).

A description is given of an example processing of FIG. 14 with reference to FIGS. 8 to 10. A description is given of a case when the sheet attribution information Jk-2 and the engine adjustment information Jg-2 are added at the image output apparatus 3. In this case, the image output apparatus 3 adds the output-side sheet information Cg-2 correlating the sheet attribution information Jk-2 and the engine adjustment information Jg-2 to the second sheet information database Cg. Further, the image output apparatus 3 transmits the sheet attribution information Jk-2, the engine adjustment value information Jgs-2, and the addition report to the DFE apparatus 2. Then, the DFE apparatus 2 adds DFE-side sheet information Cd-2' correlating the sheet attribution information Jk-2 and the image processing setting information Jd-2' setting initial values to each of the parameters to the first sheet information database Cd. Then, the DFE apparatus 2 adds the integrated sheet information Ct-2' correlating the DFE-side sheet information Cd-2' and the engine adjustment value information Jgs-2 to the integrated sheet information database Ct.

A description is given of a case that the sheet attribution information Jk-2 alone is added at the image output apparatus 3. In this case, the image output apparatus 3 generates the engine adjustment information Jg-2' setting initial values to each of the parameters set for the engine adjustment information Jg-2, and generates the engine adjustment value information Jgs-2' from the engine adjustment information Jg-2', in which the engine adjustment value information Jg-2' is correlated to the sheet identification number included in the sheet attribution information Jk-2.

Then, the image output apparatus 3 generates output-side sheet information Cg-2' correlating the sheet attribution information Jk-2 and the engine adjustment information Jg-2', and adds the output-side sheet information Cg-2' to the second sheet information database Cg. Further, the image output apparatus 3 transmits the sheet attribution information Jk-2, the engine adjustment value information Jgs-2', and the addition report to the DFE apparatus 2. Then, the DFE apparatus 2 generates image processing setting information Jd-2' setting initial values to each of the parameters, and adds DFE-side sheet information Cd-2' correlating the image processing setting information Jd-2' and the sheet attribution information Jk-2 to the first sheet information database Cd. Further, the DFE apparatus 2 adds integrated sheet information Ct-2" correlating the DFE-side sheet information Cd-2' and the engine adjustment value information Jgs-2' to the integrated sheet information database Ct.

A description is given of a case when the sheet attribution information Jk-1 and the image processing setting information Jd-1 are added at the DFE apparatus 2. In this case, the DFE apparatus 2 generates the DFE-side sheet information Cd-1 correlating the sheet attribution information Jk-1 and the image processing setting information Jd-1, and adds the DFE-side sheet information Cd-1 to the first sheet information database Cd. Then, the DFE apparatus 2 transmits the addition report, and the DFE-side sheet information Cd-1 to the image output apparatus 3. When the image output apparatus 3 receives the addition report from the DFE apparatus 2, the image output apparatus 3 generates engine adjustment information Jg-1' setting pre-set initial values to each of the parameters based on the values of the sheet attribution information Jk-1. Then, the image output apparatus 3 adds output-side sheet information Cg-1' correlating the sheet attribution information Jk-1 and the engine adjustment information Jg-1' to the second sheet information database Cg. Further, the image output apparatus 3 transmits the sheet attribution information Jk-1, and the engine adjustment value information Jgs-1' generated from the engine adjustment information Jg-1' to the DFE apparatus 2 with the addition response, in which the engine adjustment value information Jgs-1' is correlated with the value of the sheet identification number of the sheet attribution information Jk-1. When the DFE apparatus 2 receives the addition response, the DFE apparatus 2 generates integrated sheet information Ct-1' correlating the DFE-side sheet information Cd-1 and the engine adjustment value information Jgs-1', and adds the integrated sheet information Ct-1' to the integrated sheet information database Ct.

A description is given of a case when the sheet attribution information Jk-1 alone is added at the DFE apparatus 2. In this case, the DFE apparatus 2 generates the image processing setting information Jd-1' setting initial values to each of the parameters, in which the value of the sheet identification number included in the image processing setting information Jd-1' is correlated with the sheet attribution information Jk-1. The DFE apparatus 2 generates DFE-side sheet information Cd-1' correlating the sheet attribution information Jk-1 and the image processing setting information Jd-1', and adds DFE-side sheet information Cd-1' to the first sheet information database Cd. Then, the DFE apparatus 2 transmits the addition report, and the DFE-side sheet information Cd-1' to the image output apparatus 3. When the image output apparatus 3 receives the addition report from the DFE apparatus 2, the image output apparatus 3 generates the sheet attribution information Jk-1 included in the DFE-side sheet information Cd-1', and the engine adjustment information Jg-1' setting pre-set initial values to each of the parameters based on the sheet attribution information Jk-1. Then, the image output apparatus 3 adds output-side sheet information Cg-1' correlating the sheet attribution information Jk-1 and the engine adjustment information Jg-1' to the second sheet information database Cg. Further, the image output apparatus 3 transmits the sheet attribution information Jk-1, and the engine adjustment value information Jgs-1' generated from the engine adjustment information Jg-1' to the DFE apparatus 2 with the addition response. When the DFE apparatus 2 receives the addition response, the DFE apparatus 2 generates integrated sheet information Ct-1" correlating the DFE-side sheet information Cd-1' and the engine adjustment value information Jgs-1', and adds the integrated sheet information Ct-1" to the integrated sheet information database Ct.

As above described, the image forming system can be managed by using the above described information as required, in which each information can be summarized as follows.

The image processing setting information Jd-1' and Jd-2' indicate the image processing setting information, setting initial values to each of the parameters set for the image processing setting information. The engine adjustment information Jg-1' and Jg-2' indicate the engine adjustment information, setting initial values to each of the parameters set for the engine adjustment information. The engine adjustment value information t Jgs-1' and Jgs-2' are respectively generated from the engine adjustment information Jg-1' and Jg-2'.

The DFE-side sheet information Cd-1' indicates DFE-side sheet information including the image processing setting information Jd-1'. The DFE-side sheet information Cd-2' indicates DFE-side sheet information including the image processing setting information Jd-2'. The output-side sheet information Cg-1' indicates output-side sheet information including the engine adjustment information Jg-1'. The output-side sheet information Cg-2' indicates output-side sheet information including the engine adjustment information Jg-2'.

The integrated sheet information Ct-1' indicates integrated sheet information including the engine adjustment value information t Jgs-1'. The integrated sheet information Ct-1" indicates integrated sheet information including the image processing setting information Jd-1' and the engine adjustment value information t Jgs-1'. The integrated sheet information Ct-2' indicates integrated sheet information including the engine adjustment value information t Jgs-2'. The integrated sheet information Ct-2" indicates integrated sheet information including the image processing setting information Jd-2' and the engine adjustment value information t Jgs-2'.

Therefore, as to the above described image forming system 1, when the DEF-side sheet information or the output-side sheet information is added at any one of the DFE apparatus 2 and the image output apparatus 3, at least a part of the output-side sheet information or the DEF-side sheet information is added to the other one of the DFE apparatus 2 and the image output apparatus 3, and then the integrated sheet information is generated, with which the DEF-side sheet information and the output-side sheet information can be synchronized.

Further, when the integrated sheet information database "Ct" is already prepared or generated in the image forming system 1, and a user inputs a deletion request (deletion operation) of sheet information, a deletion process of sheet information is performed as illustrated in FIG. 15. FIG. 15 is a third sequential chart of updating each of the databases in the image forming system 1.

A description is given of a case that the image output apparatus 3 receives a deletion request with reference to FIG. 15. When the image output apparatus 3 receives the deletion request of the output-side sheet information via the engine adjustment information input unit 71 (step S41), the image output apparatus 3 performs the deletion process of the output-side sheet information from the second sheet information database "Cg" (step S42). Further, if the image output apparatus 3 includes the sheet attribution information input unit 52, and the image output apparatus 3 receives the deletion request of the output-side sheet information via the sheet attribution information input unit 52 (step S41), the image output apparatus 3 performs the deletion process of the output-side sheet information from the second sheet information database "Cg" (step S42). Specifically, at the image output apparatus 3, the output-side storage controller 73 deletes the output-side sheet information corresponding to the deletion request from the second sheet information database "Cg" (step S32). Then, after the image output apparatus 3 deletes the output-side sheet information, the image output apparatus 3 transmits the sheet identification number included in the deleted output-side sheet information, and a deletion report to the DFE apparatus 2 (step S43).

When the DFE apparatus 2 receives the deletion report of the output-side sheet information from the image output apparatus 3 (step S43), under the control of the synchronization unit 55, the DFE-side storage controller 54 deletes the DEF-side sheet information having the sheet identification number identical to the sheet identification number reported with the deletion report from the first sheet information database "Cd" (step S44). Further, at the DFE apparatus 2, the integrated sheet information generator 57 deletes the integrated sheet information having the sheet identification number identical to the sheet identification number reported with the deletion report from the integrated sheet information database "Ct" (step S45).

A description is given of a case when the DFE apparatus 2 performs the deletion request of the DEF-side sheet information with reference to FIG. 15. When the DFE apparatus 2 receives the deletion request of the DEF-side sheet information via the image processing setting information input unit 51 and the sheet attribution information input unit 52 (step S46), the DFE-side storage controller 54 deletes the DEF-side sheet information corresponding to the deletion request from the first sheet information database "Cd" (step S47). Further, at the DFE apparatus 2, the integrated sheet information generator 57 deletes the integrated sheet information having the sheet identification number identical to the sheet identification number included in the sheet information deleted from the first sheet information database "Cd" from the integrated sheet information database "Ct" (step S38).

When the DFE apparatus 2 deletes the DEF-side sheet information and the integrated sheet information respectively from the first sheet information database "Cd" and the integrated sheet information database "Ct," the synchronization unit 55 transmits the sheet identification number included in the deleted DEF-side sheet information, and the deletion report of the DEF-side sheet information to the image output apparatus 3 (step S49).

When the image output apparatus 3 receives the deletion report from the DFE apparatus 2, the image output apparatus 3 deletes the output-side sheet information having the sheet identification number identical to the sheet identification number received with the deletion report from the second sheet information database "Cg" (step S50).

A description is given of an example processing of FIG. 15 with reference to FIGS. 8 to 10. A description is given of a case that the image output apparatus 3 receives a deletion request of the output-side sheet information "Cg-2." In this case, the image output apparatus 3 deletes the output-side sheet information "Cg-2" from the second sheet information database "Cg." Then, the image output apparatus 3 transmits the sheet identification number "2" included in the output-side sheet information "Cg-2" and the deletion report to the DFE apparatus 2. Further, for example, when the deletion request of the sheet attribution information Jk-2 is issued, and when the deletion request of the engine adjustment information "Jg-2" is issued, the image output apparatus 3 can also deletes the output-side sheet information "Cg-2" including these information. When the DFE apparatus 2 receives the sheet identification number "2" and the deletion report, the DFE apparatus 2 deletes the DFE-side sheet information "Cd-2" having the sheet identification number "2" from the first sheet information database "Cd." Then, the DFE apparatus 2 deletes the integrated sheet information Ct-2 having the sheet identification number "2" from the integrated sheet information database "Ct."

A description is given of a case when the DFE apparatus 2 receives the deletion request of the DFE-side sheet information "Cd-1." In this case, the DFE apparatus 2 deletes the DFE-side sheet information "Cd-1" from the first sheet information database "Cd." Then, the DFE apparatus 2 deletes the integrated sheet information "Ct-1" having the sheet identification number identical to the sheet identification number of "1" included in the DFE-side sheet information "Cd-1" from the integrated sheet information database "Ct." Then, the DFE apparatus 2 transmits the sheet identification number of "1" and the deletion report to the image output apparatus 3. After the image output apparatus 3 receives the sheet identification number of "1" and the deletion report, the image output apparatus 3 deletes the output-side sheet information "Cg-1" having the sheet identification number of "1" from the second sheet information database "Cg." Therefore, as to the image forming system 1, when the sheet information is deleted at any one of the DFE apparatus 2 and the image output apparatus 3, the sheet information having the same sheet identification number is deleted from other one of the DFE apparatus 2 and the image output apparatus 3, and then the integrated sheet information is deleted, with which the DEF-side sheet information and the output-side sheet information can be synchronized.

Figure 16:
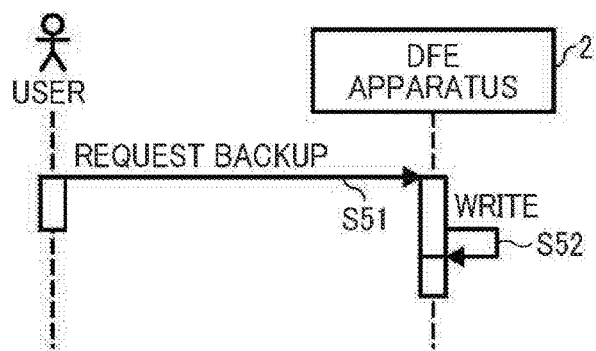
FIG. 16 is a sequential chart of a backup processing of sheet information database.

A description is given of a case when a backup processing of the sheet information database is performed in the image forming system 1 with reference to FIG. 16. FIG. 16 is a sequential chart of a backup processing of the sheet information database. In this case, the portable storage medium Mk is already attached to the storage medium connection unit 60 of the DFE apparatus 2 by a user before the DFE apparatus 2 received a backup instruction from the user (step S51).

Then, at the DFE apparatus 2, the storage destination controller 58 writes and stores the integrated sheet information database "Ct" stored in the integrated sheet information storage 56 to the portable storage medium Mk via the storage medium connection unit 60 (step S52).

If the storage medium connection unit 60 is also disposed at the image output apparatus 3, the user can attach the portable storage medium Mk to the storage medium connection unit 60 of the image output apparatus 3 to store the integrated sheet information database "Ct" to the portable storage medium Mk via the storage medium connection unit 60 of the image output apparatus 3. In this case, the output-side storage controller 73 of the image output apparatus 3 can acquire the integrated sheet information database "Ct" from the integrated sheet information storage 56 of the DFE apparatus 2, and writes and stores the integrated sheet information database "Ct" to the portable storage medium Mk via the storage medium connection unit 60 of the image output apparatus 3.

Therefore, as to the image forming system 1, the integrated sheet information database "Ct" configured with the sheet attribution information "Jk", the image processing setting information "Jd," and the engine adjustment information "Jg" having set with the synchronized status can be stored to the portable storage medium Mk.

Figure 17:
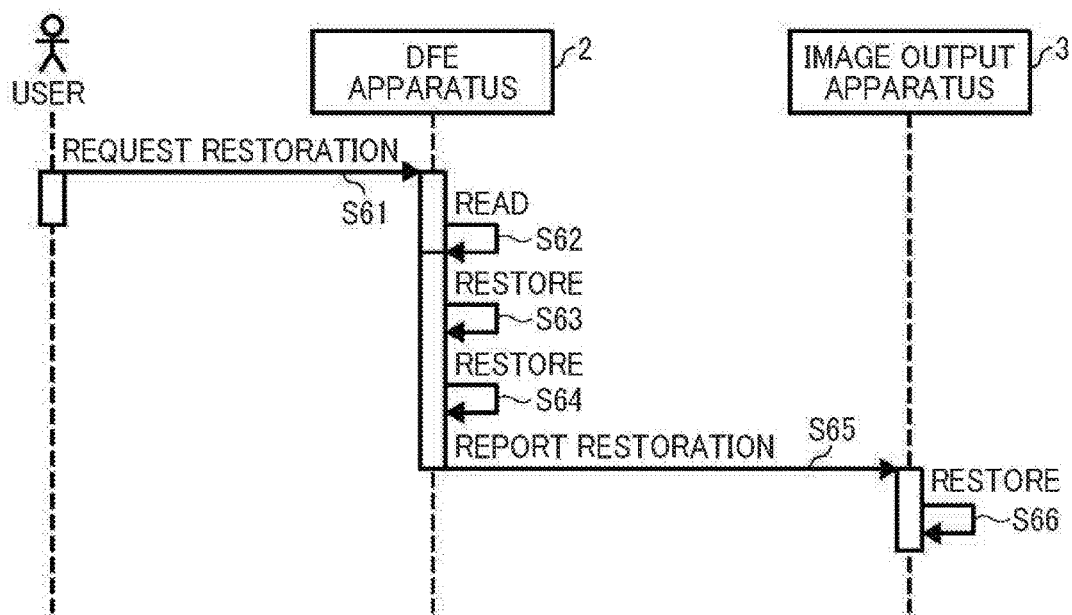
FIG. 17 is a sequential chart of a restoration processing of sheet information.

A description is given of a restoration processing of sheet information with reference to FIG. 17. FIG. 17 is a sequential chart of the restoration processing of sheet information. When the restoration instruction of the first sheet information database "Cd" and the second sheet information database "Cg" is issued to the DFE apparatus 2 (step S61), the restoration controller 59 reads the integrated sheet information database "Ct" from the portable storage medium Mk via the storage medium connection unit 60 (step S62). In this case, the portable storage medium Mk is already attached to the storage medium connection unit 60 of the DFE apparatus 2 by the user before the restoration instruction is issued in the image forming system 1.

The restoration controller 59 restores the integrated sheet information database "Ct" read from the portable storage medium Mk to the integrated sheet information storage 56 (step S63). Further, the restoration controller 59 extracts the sheet attribution information "Jk" and the image processing setting information "Jd" from the restored integrated sheet information database "Ct" to reconfigure and restore the first sheet information database "Cd" to the DFE-side storage 53 (step S64). Further, the restoration controller 59 extracts the sheet attribution information "Jk" and the engine adjustment value information "Jgs" from the restored integrated sheet information database "Ct," and transmits the sheet attribution information "Jk" and the engine adjustment value information "Jgs" to the image output apparatus 3 with a restoration report (step S65).

When the image output apparatus 3 receives the sheet attribution information "Jk" and the engine adjustment value information "Jgs" from the DFE apparatus 2 (step S65), the image output apparatus 3 generates the engine adjustment information "Jg" from the received engine adjustment value information "Jgs," reconfigures the second sheet information database "Cg" by correlating the generated engine adjustment information "Jg" and the sheet attribution information "Jk," and the output-side storage controller 73 restores and stores the second sheet information database "Cg" to the output-side storage 72 (step S66).

Further, if the storage medium connection unit 60 is also disposed at the image output apparatus 3, the user can attach the portable storage medium Mk to the storage medium connection unit 60 of the image output apparatus 3 to restore the integrated sheet information database "Ct."

Therefore, by extracting the sheet attribution information "Jk," the image processing setting information "Jd," and the engine adjustment information "Jg" having set with the synchronized status from the integrated sheet information database "Ct," the first sheet information database "Cd" of the DFE apparatus 2 and the second sheet information database "Cg" of the image output apparatus 3 can be reconfigured.

A description is given of a printing operation in the image forming system 1. As to the image forming system 1, when each of the computers PC1 to PCn issues a print request, each of the computers PC1 to PC transmits the print request designated with a sheet name or a sheet identification number, and image data to the DFE apparatus 2.

The DFE apparatus 2 performs the image processing to the image data based on the image processing setting information "Jd" included in the first sheet information database "Cd," in the sheet information is designated by the print request. Further, the DFE apparatus 2 performs the required image processing to the image data based on the sheet attribution information "Jk," and then the DFE apparatus 2 transfers the processed image data and the sheet identification number to the image output apparatus 3.

The image output apparatus 3 performs the required processing to the image data processed by the DFE apparatus 2 based on the engine adjustment information "Jg" included in the second sheet information database "Cg," which is designated by the sheet identification number, and outputs an image on a sheet.

As to the above described image forming system 1 of one or more example embodiments of the present invention, the sheet attribution information "Jk" stored in the DFE apparatus 2, and the image processing setting information "Jd" and the engine adjustment information "Jg" stored in the image output apparatus 3 separately can be set with the synchronized status consistently. Therefore, the image processing setting information "Jd" and the engine adjustment information "Jg," and the sheet attribution information "Jk" having set with the synchronized status can be easily managed.

Further, as to the image forming system 1 of one or more example embodiments of the present invention, when the editing such as changing of the first sheet information database "Cd" and the second sheet information database "Cg" is performed at any one of the DFE apparatus 2 and the image output apparatus 3, the first sheet information database "Cd" and the second sheet information database "Cg," and the integrated sheet information database "Ct" at other one of the DFE apparatus 2 and the image output apparatus 3 can be edited by synchronizing the sheet information. Therefore, the first sheet information database "Cd," the second sheet information database "Cg," and the integrated sheet information database "Ct" can be synchronized consistently.

Further, as to the image forming system 1 of one or more example embodiments of the present invention, the integrated sheet information database "Ct" configured with the image processing setting information "Jd", the engine adjustment information "Jg" and the sheet attribution information "Jk" having set with the synchronized status can be stored in the portable storage medium Mk. Therefore, the integrated sheet information database "Ct" can be used effectively.

Further, as to the image forming system 1 of one or more example embodiments of the present invention, the integrated sheet information database "Ct" configured with the image processing setting information "Jd," the engine adjustment information "Jg," and the sheet attribution information "Jk" having set with the synchronized status can be restored by using the portable storage medium Mk. Therefore, the image processing setting information "Jd," the engine adjustment information "Jg," and the sheet attribution information "Jk" can be restored effectively and simply.

As to one or more example embodiments of the present invention, information related to image processing, information related to image forming, and attribution information of recording media can be easily managed.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A Digital Front End (DFE) apparatus communicable with an image forming apparatus that has a print engine and is useable for an image forming operation on a recording medium based on input image data, the DFE apparatus comprising:
a processor configured to rasterize print data based on processing-side sheet information to produce sheets, and to send the sheets to the image forming apparatus for printing, wherein the processing-side sheet information is stored in the DFE apparatus and correlates attribution information related to the recording medium with Digital Front End (DFE) process settings, and wherein the DFE process settings are applied by the DFE apparatus to rasterize the print data;
the processor configured, in response to reestablishing a connection between the DFE apparatus and the image forming apparatus, to:
acquire output-side sheet information from the image forming apparatus, wherein the output-side sheet information correlates attribution information related to the recording medium with engine adjustment information applied by the print engine of the image forming apparatus for an image forming operation,
generate integrated sheet information by correlating the attribution information, the DFE process settings, and the engine adjustment information, and
store the integrated sheet information in a memory of the DFE apparatus.

2. The DFE apparatus of claim 1, wherein when one of the output-side sheet information and the processing-side sheet information is changed, the processor synchronizes the other one of the output-side sheet information and the processing-side sheet information, and the integrated sheet information, to match with the changed one of the output-side sheet information and the processing-side sheet information.

3. The DFE apparatus apparatus of claim 1,
wherein the memory is a volatile memory disposed for the DFE apparatus,
wherein the DFE apparatus further comprises an interface couplable with a portable memory,
wherein the processor transfers the integrated sheet information read out from the volatile memory onto the portable memory when the portable memory is coupled to the interface of the DFE apparatus and the DFE apparatus receives a storing instruction of the integrated sheet information.

4. The DFE apparatus apparatus of claim 3, wherein when the portable memory is coupled to the interface of the DFE apparatus and the DFE apparatus receives a restoration instruction of sheet information, the processor reads the integrated sheet information from the portable memory to restore the output-side sheet information and the processing-side sheet information.

5. The image forming system of claim 1, wherein the DFE process settings include parameters for one or more of a number of pages to be printed on one sheet side, a halftone pattern designation, and a watermark designation.

6. The image forming system of claim 1, wherein the engine adjustment information includes parameters for one or more of a fusing temperature, a print position correction, and a toner adhesion amount correction.

7. An image forming system comprising:
a Digital Front End (DFE) apparatus including a first processor to rasterize print data based on processing-side sheet information to produce sheets, and to send the sheets to an image forming apparatus for printing, wherein the DFE apparatus stores the processing-side sheet information which correlates attribution information related to a recording medium with DFE process settings which are applied by the first processor to rasterize the print data; and
the image forming apparatus which is communicable with the DFE apparatus and includes a second processor and a print engine to form an image on the recording medium based on the sheets received from the DFE apparatus, wherein the image forming apparatus stores output-side sheet information which correlates attribution information related to the recording medium with engine adjustment information applied by the print engine for an image forming operation;
wherein, in response to reestablishing a communication link between the DFE apparatus and the image forming apparatus, the first processor of the DFE apparatus is configured to acquire the output-side sheet information from the image forming apparatus, generate integrated sheet information by correlating the attribution information, the DFE process settings, and the engine adjustment information, and store the integrated sheet information in a memory of the DFE apparatus.

8. The image forming system of claim 7, wherein the image forming apparatus generates engine adjustment value information, which is a list of values of parameters included in the engine adjustment information arranged with an order of the parameters set for the engine adjustment information, and the DFE apparatus acquires the engine adjustment value information generated from the engine adjustment information.

9. A method of managing sheet information for an image forming system including a Digital Front End (DFE) apparatus and an image forming apparatus that has a print engine and is communicable with the DFE apparatus for an image forming operation on a recording medium based on the image data processed by the DFE apparatus, the method comprising:
    rasterizing print data based on processing-side sheet information to produce sheets, and sending the sheets to the image forming apparatus for printing, wherein the processing-side sheet information is stored in the DFE apparatus and correlates attribution information related to the recording medium with Digital Front End (DFE) process settings, and wherein the DFE process settings are applied by the DFE apparatus to rasterize the print data;
    in response to reestablishing a connection between the DFE apparatus and the image forming apparatus:
        acquiring, at the DFE apparatus, output-side sheet information stored in the image forming apparatus, wherein the output-side sheet information correlates attribution information related to the recording medium with engine adjustment information applied by the print engine of the image forming apparatus for an image forming operation;
        generating integrated sheet information by correlating the attribution information, the DFE process settings, and the engine adjustment information; and
        storing the integrated sheet information in a memory of the DFE apparatus.

10. A non-transitory storage medium storing a program that, when executed by a computer, causes the computer to execute the method of claim 9.

* * * * *